United States Patent
Okuyama et al.

(10) Patent No.: US 9,581,749 B2
(45) Date of Patent: Feb. 28, 2017

(54) LIGHTING UNIT, DISPLAY, AND THREE-DIMENSIONAL DISPLAY

(75) Inventors: Kentaro Okuyama, Miyagi (JP); Makoto Shinoda, Tokyo (JP); Shinpei Nagatani, Kanagawa (JP); Yuji Takahashi, Miyagi (JP); Tomoaki Suzuki, Miyagi (JP); Shogo Shinkai, Miyagi (JP); Akira Ebisui, Miyagi (JP); Taizo Nishimura, Miyagi (JP)

(73) Assignee: Sony Corporation, Tokyo (JP)

( * ) Notice: Subject to any disclaimer, the term of this patent is extended or adjusted under 35 U.S.C. 154(b) by 142 days.

(21) Appl. No.: 13/991,599

(22) PCT Filed: Dec. 8, 2011

(86) PCT No.: PCT/JP2011/078445
§ 371 (c)(1),
(2), (4) Date: Jun. 4, 2013

(87) PCT Pub. No.: WO2012/081497
PCT Pub. Date: Jun. 21, 2012

(65) Prior Publication Data
US 2013/0258711 A1      Oct. 3, 2013

(30) Foreign Application Priority Data

Dec. 17, 2010   (JP) .................................. 2010-282191

(51) Int. Cl.
*F21V 7/04*           (2006.01)
*F21V 8/00*           (2006.01)
(Continued)

(52) U.S. Cl.
CPC .......... *G02B 6/0011* (2013.01); *G02B 6/0055* (2013.01); *G02F 1/1334* (2013.01);
(Continued)

(58) Field of Classification Search
CPC .. G02B 6/0011; G02B 6/0055; G02B 6/0058; G02B 6/0083; G02F 1/1334;
(Continued)

(56) References Cited

U.S. PATENT DOCUMENTS 5,640,259 A * 6/1997 Sawayama .......... G02F 1/13363
349/177
7,227,312 B2 * 6/2007 Kwak et al. ............... 315/169.3
(Continued)

FOREIGN PATENT DOCUMENTS

| JP | 11-212088   | 8/1999  |
| JP | 2001-92370  | 4/2001  |
| JP | 2002-049037 | 2/2002  |
| JP | 2009-134204 | 6/2009  |
| JP | 2009-283383 | 12/2009 |
| JP | 2010-092682 | 4/2010  |
| JP | 2010-276928 | 12/2010 |

OTHER PUBLICATIONS

Extended European Search Report issued May 26, 2014 in corresponding European Patent Application No. 11848816.2.

*Primary Examiner* — Peggy Neils
*Assistant Examiner* — Tsion Tumebo
(74) *Attorney, Agent, or Firm* — K&L Gates LLP

(57) ABSTRACT

In a scan system, a lighting unit, a display, and a three-dimensional display that have all of high luminance, low power consumption, and high reliability of a circuit board are provided. A light modulation device bonded to a light guide plate is provided with a light modulation layer exhibiting scattering property or transparency to light propagating through the light guide plate. The light modulation layer is interposed between a lower electrode that is configured of a plurality of partial electrodes extending in a direction parallel to a light incident surface and a sheet-like upper electrode. A drive circuit sequentially drives the plurality of partial electrodes to scan a region exhibiting the scattering property of the light modulation layer in a direction orthogonal to the light incident surface.

15 Claims, 19 Drawing Sheets

(51) Int. Cl.
*H04N 13/04* (2006.01)
*G02F 1/1334* (2006.01)
*G02F 1/1335* (2006.01)
*G09G 3/34* (2006.01)
*G09G 3/00* (2006.01)
*G09G 3/36* (2006.01)

(52) U.S. Cl.
CPC ....... *G02F 1/133615* (2013.01); *G09G 3/342* (2013.01); *H04N 13/0438* (2013.01); *H04N 13/0497* (2013.01); *G02B 6/0058* (2013.01); *G02B 6/0083* (2013.01); *G02F 2001/133601* (2013.01); *G02F 2202/022* (2013.01); *G02F 2202/40* (2013.01); *G02F 2203/62* (2013.01); *G09G 3/003* (2013.01); *G09G 3/36* (2013.01); *G09G 2310/024* (2013.01); *G09G 2320/0209* (2013.01)

(58) Field of Classification Search
CPC ... G02F 1/133615; G02F 2001/133601; G02F 2202/022
USPC ..................... 362/611, 97.1, 97.2, 97.3, 97.4
See application file for complete search history.

(56) References Cited

U.S. PATENT DOCUMENTS

| | | | |
|---|---|---|---|
| 2002/0033909 A1 | 3/2002 | Hiyama et al. | |
| 2002/0154256 A1* | 10/2002 | Gotoh | G02F 1/133615 349/65 |
| 2005/0168491 A1* | 8/2005 | Takahara et al. | 345/690 |
| 2006/0221631 A1* | 10/2006 | Uehara et al. | 362/600 |
| 2006/0244698 A1* | 11/2006 | Koshimizu et al. | 345/80 |
| 2007/0176887 A1* | 8/2007 | Uehara | G02F 1/1323 345/102 |
| 2007/0289768 A1* | 12/2007 | Moore et al. | 174/98 |
| 2007/0290960 A1* | 12/2007 | Heo et al. | 345/82 |
| 2009/0096754 A1* | 4/2009 | Hinata | 345/173 |
| 2009/0103053 A1* | 4/2009 | Ichikawa et al. | 353/33 |
| 2009/0231501 A1* | 9/2009 | Harada | G02F 1/133362 349/25 |
| 2010/0085510 A1 | 4/2010 | Okuyama et al. | |
| 2010/0289884 A1* | 11/2010 | Kang | G02B 27/2228 348/58 |

\* cited by examiner

LIGHTING UNIT, DISPLAY, AND THREE-DIMENSIONAL DISPLAY

CROSS REFERENCES TO RELATED APPLICATIONS

The present application is a national stage of International Application No. PCT/JP2011/078445 filed on Dec. 8, 2011 and claims priority to Japanese Patent Application No. 2010-282191 filed on Dec. 17, 2010, the disclosure of which is incorporated herein by reference.

BACKGROUND

The invention relates to a lighting unit provided with a light modulation device that exhibits scattering property or transparency to light. Moreover, the invention relates to a display and a three-dimensional display that include the above-described lighting unit.

In recent years, a backlight of a scan system is used to improve moving picture responsiveness of a liquid crystal television. Further, recently, the scan system attracts attention to suppress crosstalk of 3D display using a shutter eyeglasses system. Moreover, particularly in a large television, a combination of an edge light and a light guide plate is a main stream to meet request of thickness reduction, and a backlight capable of being scan driven in a light guide plate system is desired (see PTLs 1 and 2).

CITATION LIST

Patent Literature

PTL 1: Japanese Unexamined Patent Application Publication No. H1-082019
PTL 2: U.S. Patent Application Publication No. 2005/00075616 specification
PTL 3: Japanese Unexamined Patent Application Publication No. 2001-92370
PTL 4: Japanese Unexamined Patent Application Publication No. 2009-283383

SUMMARY

Incidentally, the backlight in such a scan system has an issue of display luminance being dark. For example, when a screen is segmented into eight sections, if power enough to obtain eight times luminance can be supplied to a light source in a display of segmented one section, the display luminance is equivalent in principle to luminance when scan is not performed. However, power corresponding to about two times luminance is only supplied actually, and thus the display luminance is lowered. In addition, it is not preferable that a large power be applied to a light source in such an extremely short time in terms of light use efficiency and low power consumption. Further, reliability of the circuit board is necessarily secured in consideration of inrush power (specifically, large power temporality flows through the light source upon power supply), and thus it is unfit for cost reduction.

Moreover, in a large television, employment of an edge light guide plate is progressing in order to meet request of thickness reduction of a backlight, similarly to medium and small-sized liquid crystal displays. For example, PTL 3 discloses that, in an edge light guide plate system, a light guide plate is configured of a plurality of blocks, a reflector is provided between the blocks to achieve scan of strip-shaped illumination light. In addition, for example, PTL 4 discloses that, instead of dividing a light guide plate, a prism structure is formed on a main surface of a light guide plate to achieve scan of strip-shaped illumination light. However, issues occur in all of display luminance, consumed power, and reliability of a circuit board even by using the methods described in these literatures.

In view of the above circumstances, it is a first object of the invention to provide a lighting unit having all of high luminance, low power consumption, and high reliability of a circuit board in a scan system. In addition, it is a second object of the invention to provide a display and a three-dimensional display that include such a lighting unit.

A lighting unit according to the invention includes a light guide plate, a light source disposed on a side surface of the light guide plate, and a light modulation device disposed on a surface or in an inside of the light guide plate and bonded to the light guide plate. The light modulation device includes a pair of transparent substrates disposed opposite to each other with a distance in between, a pair of electrodes disposed on respective surfaces of the pair of transparent substrates, and a light modulation layer provided in a gap between the pair of transparent substrates. Here, one or both of the pair of electrodes have a plurality of partial electrodes arranged in a direction orthogonal to a light incident surface of side surfaces of the light guide plate, the light incident surface receiving light from the light source. The light modulation layer totally or partially exhibits scattering property or transparency to the light from the light source depending on a magnitude of an electric field generated by the electrodes. A drive circuit sequentially drives the plurality of partial electrodes on a predetermined unit basis to scan a region exhibiting the scattering property of the light modulation layer in the direction orthogonal to the light incident surface.

A display according to the invention includes: a lighting unit outputting illumination light; a display panel modulating the illumination light to output a picture; and a drive circuit driving the lighting unit and the display panel. The lighting unit included in the display includes the same components as those of the lighting unit described in the previous paragraph.

A three-dimensional display according to the invention includes a display outputting a picture and a control signal; and shutter glasses having a right-eye shutter and a left-eye shutter, the right-eye shutter and the left-eye shutter performing transmission and blocking of the picture based on the control signal. The display included in the three-dimensional display includes a lighting unit outputting illumination light, a display panel modulating the illumination light to output the picture, an output circuit outputting the control signal, and a drive circuit driving the lighting unit, the display panel, and the output circuit. In this case, the lighting unit includes the same components as those in the lighting unit described in the paragraph before the previous paragraph.

In the lighting unit, the display, and the three-dimensional display of the invention, the plurality of partial electrodes arranged in the direction orthogonal to the light incident surface are sequentially driven on a predetermined unit basis. Accordingly, the region exhibiting the scattering property (hereinafter, referred to as "scattering region") of the light modulation layer is scanned in the direction orthogonal to the light incident surface during the process in which the light emitted from the light source propagates through the light guide plate. As a result, the light that is scattered in the scattering region and is to be emitted from the upper surface of the lighting unit to the outside is scanned in the direction orthogonal to the light incident surface. At this time, the light emitted from the light source is scarcely scattered in the region exhibiting the transparency (hereinafter, referred to as "transparent region") of the light modulation layer, and thus light is scarcely leaked from the transparent region. Therefore, the light emitted from the light source is guided from the transparent region to the scattering region, and thus luminance higher than that in an existing system driving the light source is obtainable. Further, since scan driving of the light source is not performed, high luminance is obtainable without increasing power supplied to the lighting unit. In addition, in the invention, as described above, since the scan driving of the light source is not performed, inrush power that occurs in the case where large power is supplied to the light source in an extremely short time to perform the scan driving is not necessarily considered, and reliability of the circuit board is not impaired.

According to the lighting unit, the display, and the three-dimensional display of the invention, the light that is to be emitted from the upper surface of the lighting unit to the outside is scanned by scanning the scattering region of the light modulation layer instead of the scan driving of the light source, and therefore in the scan system, all of high luminance, low power consumption, high reliability of the circuit board are achievable at a time.

Additional features and advantages are described herein, and will be apparent from the following Detailed Description and the figures.

DETAILED DESCRIPTION

Hereinafter, embodiments for carrying out the invention will be described in detail with reference to drawings. Note that description will be given in the following order.
1. First embodiment (FIG. 1 to FIG. 15)
An example in which a horizontal alignment inversion PDLC is provided in a backlight
2. Second embodiment (FIG. 16 to FIG. 18)
An example in which a vertical alignment inversion PDLC is provided in a backlight
3. Modifications (FIG. 19 to FIG. 27)
4. Application examples (FIG. 28 to FIG. 30)
An example in which a backlight is used as a light source of a display <1. First Embodiment>

Figure 1A:
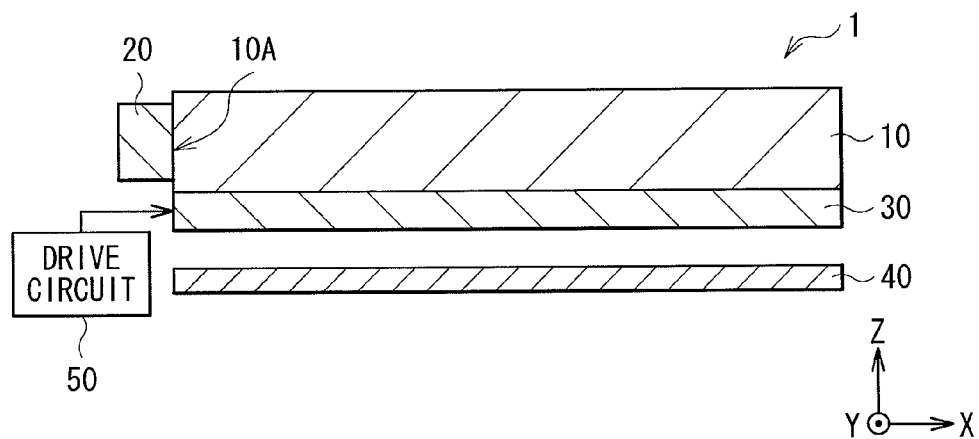
FIG. 1 is a sectional diagram illustrating an example of a configuration of a backlight according to a first embodiment of the invention.
Figure 1B:
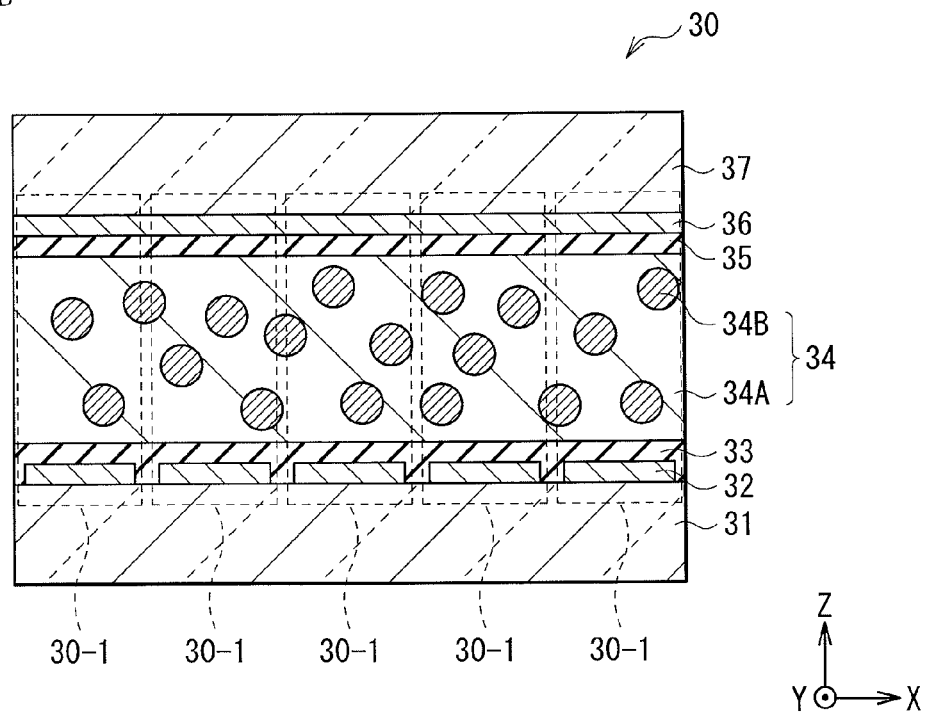

FIG. 1(A) is a sectional diagram illustrating an example of a schematic configuration of a backlight 1 according to a first embodiment of the invention. The backlight 1 corresponds to a specific example of a lighting unit of the invention. FIG. 1(B) is a sectional diagram illustrating an example of a schematic configuration of a light modulation device in the backlight 1 of FIG. 1(A). Note that FIGS. 1(A) and 1(B) are schematic illustration, and the illustration may not be the same as actual dimensions and shapes. The backlight 1 emits illumination light from an upper surface thereof, and for example, is used for illuminating a liquid crystal display panel and the like from behind. The backlight 1 includes, for example, a light guide plate 10, a light source 20 disposed on a side surface of the light guide plate 10, a light modulation device 30 and a reflector 40 disposed on a back of the light guide plate 10, and a drive circuit 50 driving the light source 20 and the light modulation device 30.

The light guide plate 10 guides light from the light source 20 that is disposed on the side surface of the light guide plate 10 to an upper surface of the light guide plate 10. The light guide plate 10 has a shape corresponding to a display panel (not illustrated) disposed on the upper surface of the light guide plate 10, for example, a rectangular parallelepiped shape surrounded by the upper surface, a lower surface, and side surfaces. Note that, in the following description, the side surface that receives the light from the light source 20, of the side surfaces of the light guide plate 10 is referred to as a light incident surface 10A. For example, the light guide plate 10 has a predetermined-patterned shape on one or both of the upper surface and the lower surface, and has a function to scatter and uniformize the light entering from the light incident surface 10A. Note that, when a voltage applied to the backlight 1 is modulated to uniformize luminance, a flat light guide plate not patterned may be used as the light guide plate 10. For example, the light guide plate 10 functions as a support body supporting an optical sheet (for example, a diffuser panel, a diffuser sheet, a lens film, or a polarization separation sheet) disposed between the display panel and the backlight 1. The light guide plate 10 is formed to contain a transparent thermoplastic resin such as polycarbonate resin (PC) and acrylic resin (polymethyl methacrylate (PMMA).

Figure 2A:
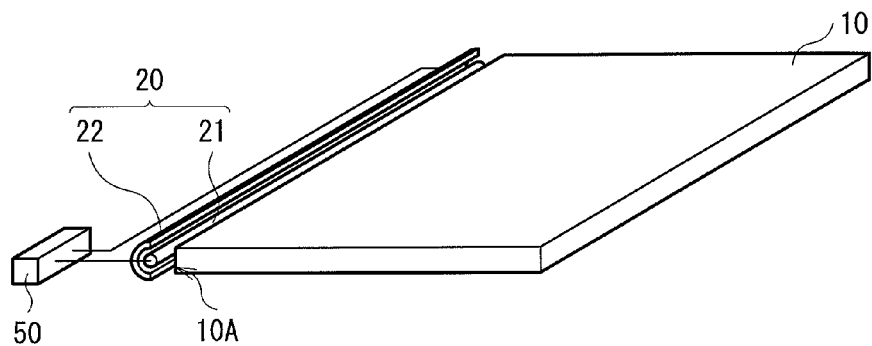
FIG. 2 is a perspective view illustrating an example of a configuration of a light source of FIG. 1.
Figure 2B:
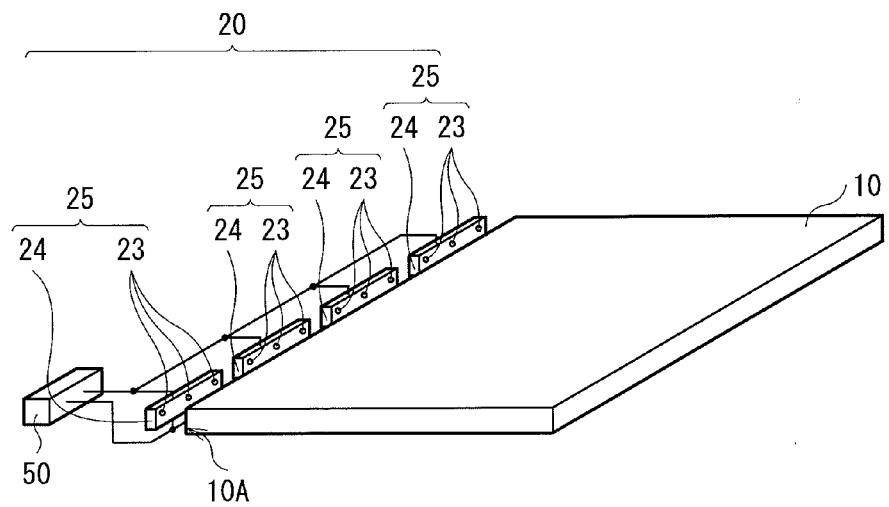
Figure 2C:
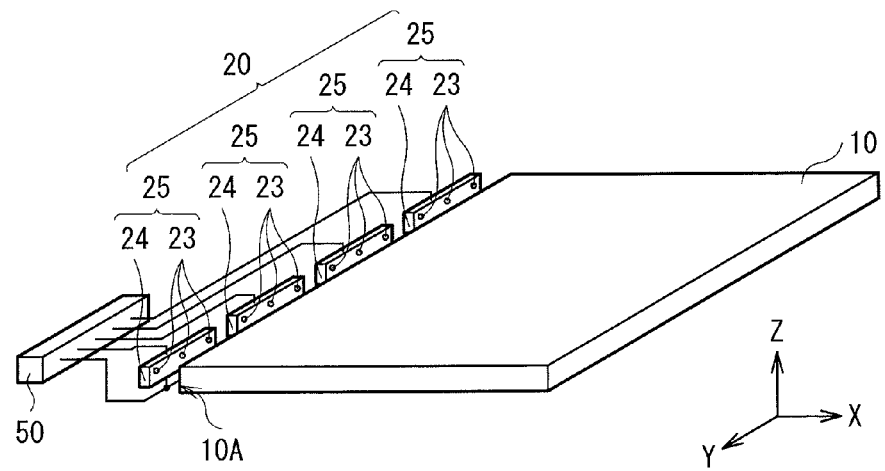

For example, as illustrated in FIG. 2(A), the light source 20 includes a linear light source 21 and a reflective mirror 22. The linear light source 21 is formed of, for example, a hot cathode fluorescent lamp (HCFL) or a cold cathode fluorescent lamp (CCFL). The reflective mirror 22 reflects, to the light incident surface 10A side, light toward a direction not directly entering the light incident surface 10A out of light emitted from the linear light source 21. For example as illustrated in FIG. 2(B) or 2(C), the light source 20 may be configured by arranging a plurality of point light sources 23 in line. Each of the point light sources 23 emits light toward the light incident surface 10A, and is configured of, for example, a light emitting device having an emission spot on a surface facing the light incident surface 10A. Examples of such a light emitting device include an LED and a laser diode (LD).

For example, as illustrated in FIG. 2(B) or 2(C), the plurality of point light sources 23 may be provided by two or more point light sources 23 on common substrates 24. In this case, a light source block 25 is configured of one substrate 24 and two or more point light sources 23 provided on the substrate 24. For example, the substrate 24 is a circuit board formed with a wiring that electrically connects the point light sources 23 to the drive circuit 50, and each of the point light sources 23 is mounted on the circuit board. The point light sources 23 provided on the common substrate 24 (the point light sources 23 in the light source block 25) are collectively (non-independently) driven by the drive circuit 50, and for example, although not illustrated, are connected to one another in parallel or in series. In addition, the point light sources 23 provided on different substrates 24 (the point light sources 23 in the respective light source blocks 25) are collectively (non-independently) driven by, for example, the drive circuit 50, and as illustrated in FIG. 2(B) for example, are connected to one another in parallel or, for example although not illustrated, are connected to one another in series. The point light sources 23 provided on the different substrates 24 (the point light sources 23 in the respective light source blocks 25) may be driven independently by, for example, the drive circuit 50. In this case, for example, as illustrated in FIG. 2(C), the point light sources 23 provided on the different substrates 24 are connected to different current paths.

Figure 3:
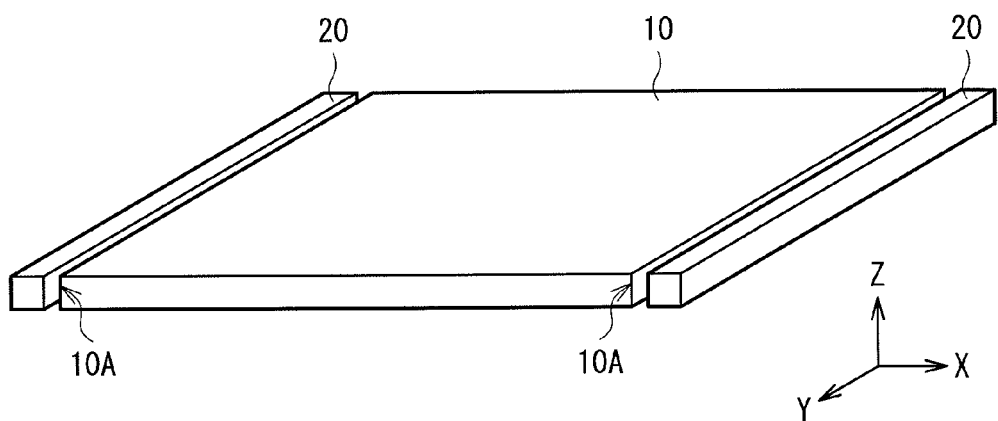
FIG. 3 is a perspective view illustrating another example of the configuration of the light source of FIG. 1.

As illustrated in FIGS. 2(A) to 2(C), the light source 20 may be provided on one side surface of the light guide plate 10, or as illustrated in FIG. 3, may be provided on two side surfaces (for example, two side surfaces opposing to each other) of the light guide plate 10.

The reflector 40 returns, to the light guide plate 10 side, light leaked from the back of the light guide plate 10 through the light modulation device 30, and for example, has a function of reflection, diffusion, scattering, and the like. This allows efficient use of light emitted from the light source 20, and also helps improvement of front luminance. The reflector 40 is formed of, for example, foamed PET (polyethylene terephthalate), an evaporated silver film, a multilayer reflective film, and white PET.

In the present embodiment, the light modulation device 30 is tightly adhered to the back (the lower surface) of the light guide plate 10 without an air layer in between, and is adhered to the back of the light guide plate 10 with, for example, an adhesive agent (not illustrated) in between. For example, as illustrated in FIG. 1(B), the light modulation device 30 is configured by arranging a transparent substrate 31, a lower electrode 32, an alignment film 33, a light modulation layer 34, an alignment film 35, an upper electrode 36, and a transparent substrate 37 in order from a back surface side (for example, the reflector 40 side) of the backlight 1.

Figure 4A:
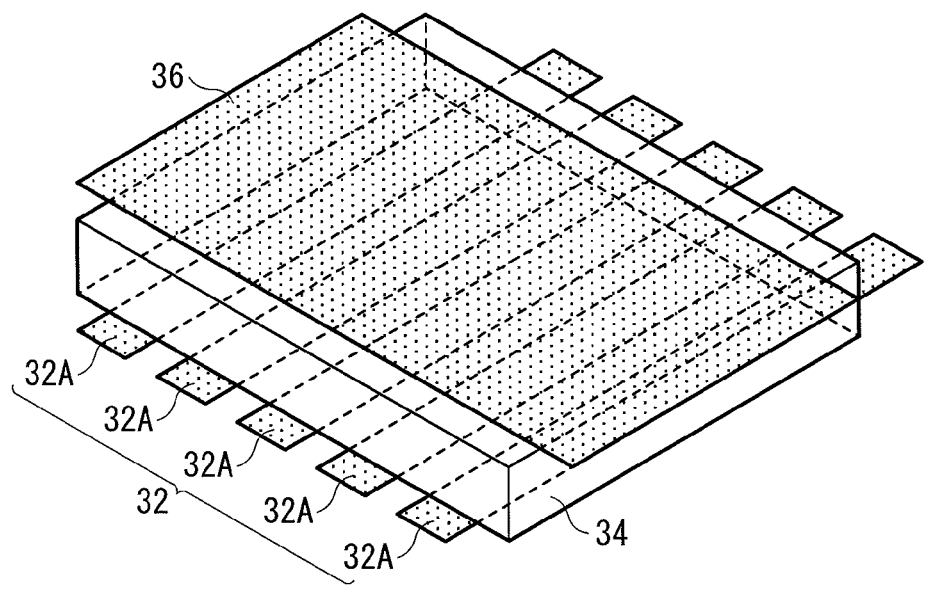
FIG. 4 is a perspective view illustrating an example of a configuration of electrodes of FIG. 1.
Figure 4B:
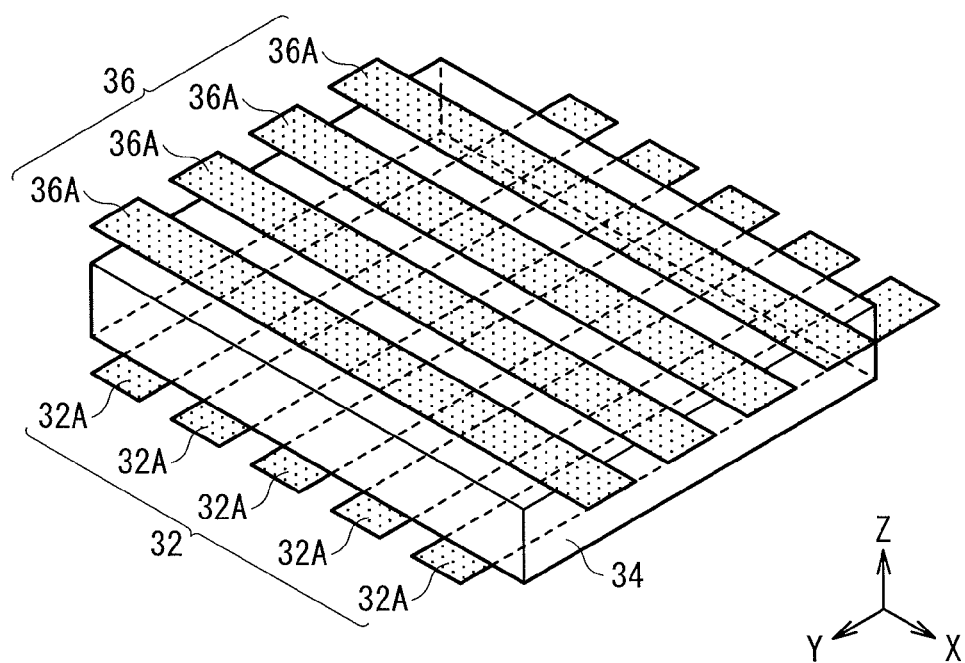

The transparent substrates 31 and 37 support the light modulation layer 34, and are each typically formed of a substrate transparent to visible light, for example, a glass plate or a plastic film. The lower electrode 32 is provided on a surface on the light modulation layer 34 side of the transparent substrate 31, and as illustrated in FIGS. 4(A) and 4(B), is formed by arranging a plurality of strip-shaped partial electrodes 32A in parallel to one another. Each of the partial electrodes 32A extends in a direction parallel to the light incident surface 10A of the light guide plate 10 as found from the direction of the XYZ coordinate axes in FIGS. 2(A) to 2(C), FIG. 3, and FIGS. 4(A) and 4(B). On the other hand, the upper electrode 36 is provided on a surface on the light modulation layer 34 side of the transparent substrate 37, and for example, as illustrated in FIG. 4(A), is a single sheet electrode formed over the entire plane.

Note that, for example, as illustrated in FIG. 4(B), the upper electrode 36 may be formed by arranging in parallel a plurality of strip-shaped partial electrodes 36A that extend in a direction intersecting (or orthogonal to) the extending direction of the partial electrodes 32A. In addition, for example, although not illustrated, the upper electrode 36 may be configured by arranging in parallel the plurality of strip-shaped partial electrodes 36A that extend in a direction parallel to the extending direction of the partial electrodes 32A to face the partial electrodes 32A. Incidentally, in the case where the upper electrode 36 is divided into the plurality of partial electrodes 36A, the partial electrodes 36A may be electrically connected to one another or may be electrically separated from one another.

Figure 5:
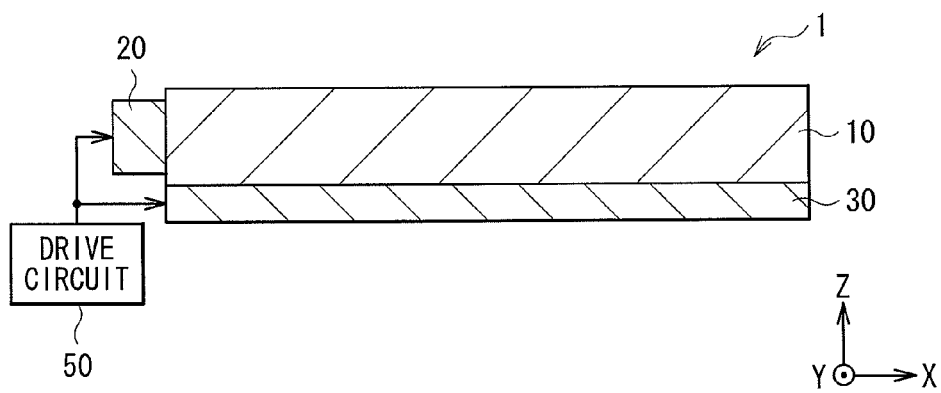
FIG. 5 is a sectional diagram illustrating another example of the configuration of the backlight of FIG. 1.

The lower electrode 32 and the upper electrode 36 is each formed of, for example, a transparent conductive material such as indium tin oxide (ITO). The transparent conductive material is preferably a material that absorbs visible light as little as possible. However, the lower electrode 32 may not be a transparent material, and for example, may be formed of a metal. Incidentally, in the case where the lower electrode 32 is formed of a metal, the lower electrode 32 also has a function to reflect light. Accordingly, in this case, for example as illustrated in FIG. 5, the reflector 40 may be omitted.

When the light modulation device 30 is viewed from a normal direction of the light modulation device 30, a region of the light modulation device 30 facing the partial electrode 32A configures a light modulation cell 30-1. For example, a region illustrated by a dashed line in FIG. 1(B) corresponds to the light modulation cell 30-1. The plurality of light modulation cells 30-1 extend in a direction parallel to the light incident surface 10A, similarly to the plurality of partial electrodes 32A, and are arranged in a direction orthogonal to the light incident surface 10A. Each of the light modulation cells 30-1 is a region capable of being independently driven by application of a predetermined voltage to the partial electrode 32A and the upper electrode 36, and exhibits transparency or scattering property to light from the light source 20 depending on a magnitude of a voltage value applied to the partial electrode 32A and the upper electrode 36. Note that the transparency and the scattering property will be described in detail when the light modulation layer 34 is described.

For example, the alignment films 33 and 35 align a liquid crystal and a monomer used for the light modulation layer 34. For example, kinds of the alignment films include a vertical alignment film and a horizontal alignment film; however in the present embodiment, the horizontal alignment film is used for the alignment films 33 and 35. Examples of the horizontal alignment film include an alignment film formed by performing rubbing treatment on polyimide, polyamide-imide, poly vinyl alcohol, or the like, and an alignment film provided with a groove by transfer or etching. Moreover, examples of the horizontal alignment film include an alignment film formed by oblique evaporation of an inorganic material such as silicon oxide, a diamond-like carbon alignment film formed by ion beam irradiation, and an alignment film formed with an electrode pattern slit. In the case where a plastic film is used as the transparent substrates 31 and 37, polyamide-imide capable of being formed at a temperature of 100° C. or lower is preferably used as the alignment films 33 and 35 because a firing temperature after the alignment films 33 and 35 are applied to the surface of the transparent substrates 31 and 37, respectively, is preferably as low as possible in manufacturing process.

Note that a horizontal alignment film that has a function to provide pretilt to a liquid crystal molecule adjacent to the horizontal alignment film is preferably used. For example, rubbing may be used as a method of developing a pretilt function of the horizontal alignment film. The pretilt is referred to as intersecting the longitudinal axis of a liquid crystal molecule adjacent to an alignment film to "a surface parallel to the surface of the alignment film" or "a normal of the alignment film" at a slight angle. For example, the above-described horizontal alignment film preferably has a function to allow the longitudinal axis of the liquid crystal molecule adjacent to the horizontal alignment film to intersect with the surface of the horizontal alignment film at slight angle in the plane parallel to the light incident surface 10A. The horizontal alignment film having such a function is achievable by, for example, making the rubbing direction parallel to the light incident surface 10A.

Moreover, it is sufficient for both of the vertical and horizontal alignment films to have a function to align the liquid crystal and the monomer, and reliability in repeat application of a voltage requested for a typical liquid crystal display is unnecessary. This is because the reliability in the voltage application after device fabrication is determined by an interface between polymerized monomer and the liquid crystal. In addition, the liquid crystal and the monomer used for the light modulation layer 34 are allowed to be aligned by, for example, application of an electric field or a magnetic field between the lower electrode 32 and the upper electrode 36, without using the alignment films 33 and 35. In other words, alignment state of the liquid crystal and the monomer in a voltage applied state is allowed to be fixed by irradiation of ultraviolet ray while the electric field or the magnetic field is applied between the lower electrode 32 and the upper electrode 36. In the case where a voltage is used for formation of the alignment films 33 and 35, electrodes are differently formed for alignment and for drive, or a dual-frequency liquid crystal in which sign of dielectric constant anisotropy is inverted by the frequency may be used for a liquid crystal material. In addition, in the case where the magnetic field is used for formation of the alignment films 33 and 35, it is preferable to use a material having large magnetic susceptibility anisotropy for the alignment films 33 and 35, and for example, it is preferable to use a material having a large number of benzene rings.

The light modulation layer 34 totally or partially exhibits scattering property or transparency to the light from the light source 20 depending on the magnitude of the electric field. Specifically, when the voltage is not applied to the partial electrodes 32A and the upper electrode 36, the light modulation layer 34 exhibits the transparency to the light from the light source 20, and when the voltage is applied to the partial electrodes 32A and the upper electrode 36, exhibits the scattering property to the light from the light source 20. For example, as illustrated in FIG. 1(B), the light modulation layer 34 is a composite layer including a bulk 34A and a plurality of microparticles 34B dispersed into the bulk 34A. The bulk 34A and the microparticles 34B have optical anisotropy.

Figure 6:
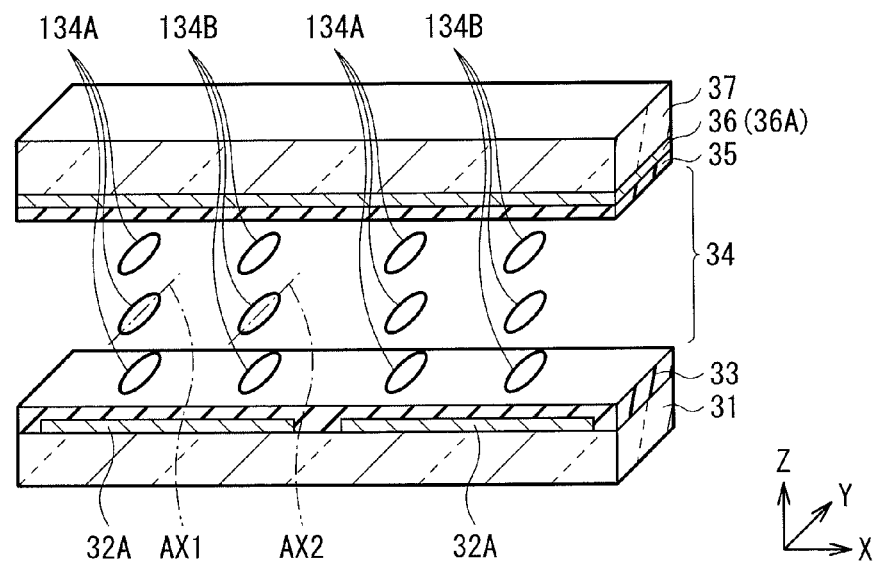
FIG. 6 is a schematic diagram for explaining a configuration when a voltage is not applied to a light modulation device of FIG. 1.

FIG. 6 schematically illustrates an example of an alignment state in the bulk 34A and the microparticles 34B when a voltage is not applied between the partial electrodes 32A and the upper electrode 36. An ellipsoid 134A in FIG. 6 illustrates an example of an index ellipsoid exhibiting refractive index anisotropy of the bulk 34A when a voltage is not applied between the partial electrodes 32A and the upper electrode 36. An ellipsoid 134B in FIG. 6 illustrates an example of an index ellipsoid exhibiting refractive index anisotropy of the microparticle 34B when a voltage is not applied between the partial electrodes 32A and the upper electrode 36. The index ellipsoid indicates a refractive index of linear polarized light entering from various directions by a tensor ellipsoid, and geometrically indicates a refractive index through viewing of a cross-sectional surface of the ellipsoid from an entering direction of the light.

Figure 7:
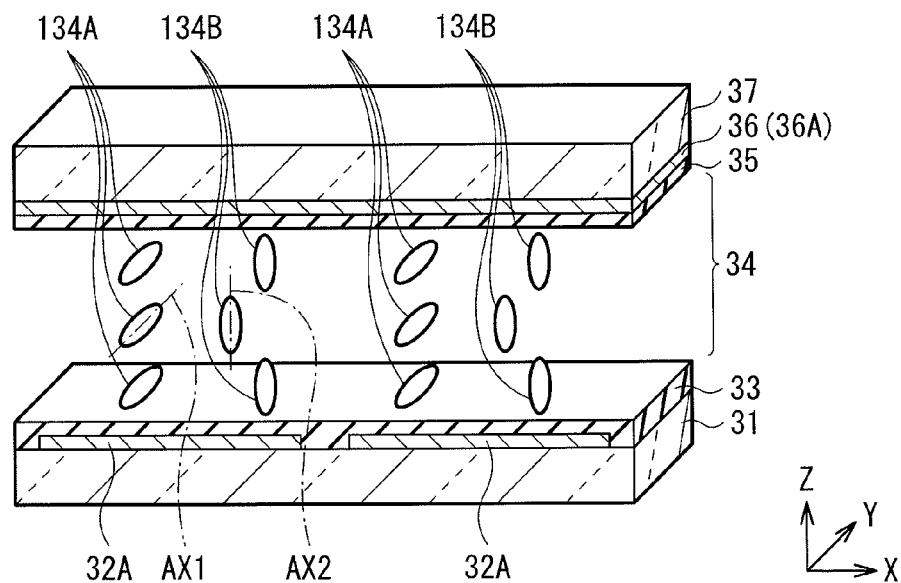
FIG. 7 is a schematic diagram for explaining a configuration when a voltage is applied to the light modulation device of FIG. 1.

FIG. 7 schematically illustrates an example of an alignment state in the bulk 34A and the microparticles 34B when a voltage is applied between the partial electrodes 32A and the upper electrode 36. The ellipsoid 134A in FIG. 7 illustrates an example of an index ellipsoid exhibiting refractive index anisotropy of the bulk 34A when a voltage is applied between the partial electrodes 32A and the upper electrode 36. The ellipsoid 134B in FIG. 7 illustrates an example of an index ellipsoid exhibiting refractive index anisotropy of the microparticle 34B when a voltage is applied between the partial electrodes 32A and the upper electrode 36.

For example, as illustrated in FIG. 6, the bulk 34A and the microparticle 34B have configuration in which a direction of an optical axis AX1 of the bulk 34A (specifically, a longitudinal axis of the ellipsoid 134A) and a direction of an optical axis AX2 of the microparticle 34B (specifically, a longitudinal axis of the ellipsoid 134B) coincide with (are parallel to) each other. Incidentally, the optical axes AX1 and AX2 each indicate a line parallel to a traveling direction of light ray having a fixed refractive index irrespective of polarization direction. In addition, it is unnecessary for the direction of the optical axis AX1 and the direction of the optical axis AX2 to constantly coincide with each other when a voltage is not applied between the lower electrode 32 and the upper electrode 36, and the direction of the optical axis AX1 may be deviated in some degree from the direction of the optical axis AX2 due to, for example, manufacturing error.

Moreover, when a voltage is not applied between the partial electrodes 32A and the upper electrode 36, the optical axis AX2 is parallel (or substantially parallel) to the light incident surface 10A of the light guide plate 10 and is parallel (or substantially parallel) to the surface of the transparent substrate 31. In other words, when a voltage is not applied between the partial electrodes 32A and the upper electrode 36, the optical axis AX2 is parallel (or substantially parallel) to a surface including the partial electrodes 32A or the upper electrode 36, and is parallel (or substantially parallel) to the extending direction of the partial electrodes 32A.

Note that, in the case where the horizontal alignment film has the above-described pretilt function, when a voltage is not applied between the partial electrodes 32A and the upper electrode 36, the optical axis AX2 is parallel (or substantially parallel) to the light incident surface 10A of the light guide plate 10, and intersects the surface of the transparent substrate 31 at a predetermined pretilt angle.

On the other hand, the bulk 34A has a configuration in which the optical axis AX1 is fixed irrespective of presence or absence of voltage application between the partial electrodes 32A and the upper electrode 36. Specifically, the optical axis AX1 is parallel (or substantially parallel) to the light incident surface 10A of the light guide plate 10, and is parallel (or substantially parallel) to the surface of the transparent substrate 31. In other words, when a voltage is not applied between the partial electrodes 32A and the upper electrode 36, the optical axis AX1 is parallel (or substantially parallel) to the optical axis AX2.

Note that, in the case where the horizontal alignment film has the above-described pretilt function, the optical axis AX1 is parallel (or substantially parallel) to the light incident surface 10A of the light guide plate 10, and intersects the surface of the transparent substrate 31 at a predetermined pretilt angle. In other words, also in this case, when a voltage is not applied between the partial electrodes 32A and the upper electrode 36, the optical axis AX1 is parallel (or substantially parallel) to the optical axis AX2.

Figure 8:
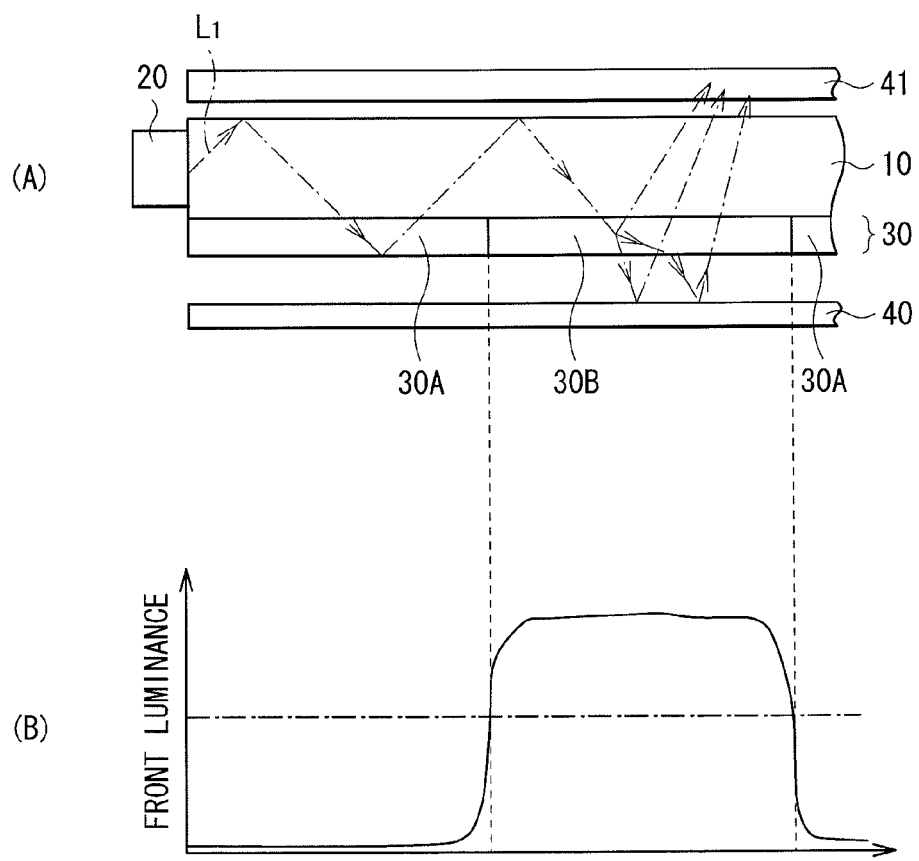
FIG. 8 is a schematic diagram for explaining a function of the backlight of FIG. 1.
Figure 9A:
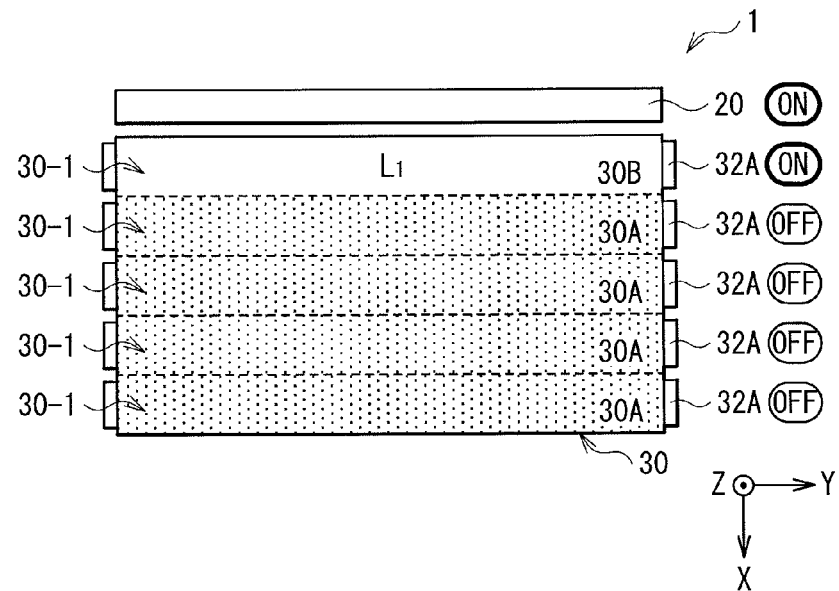
FIG. 9 is a schematic diagram for explaining scanning in a scattering region in the light modulation device.
Figure 9B:
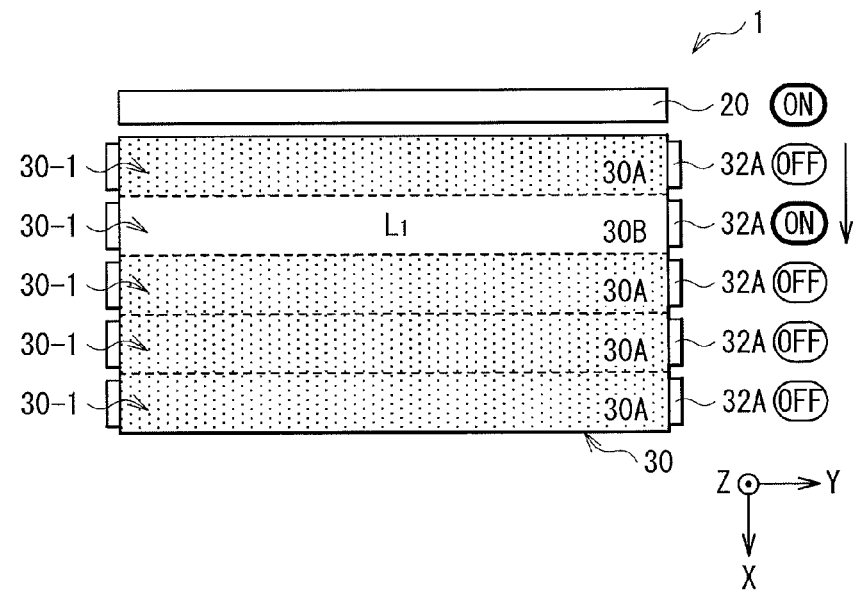
Figure 10A:
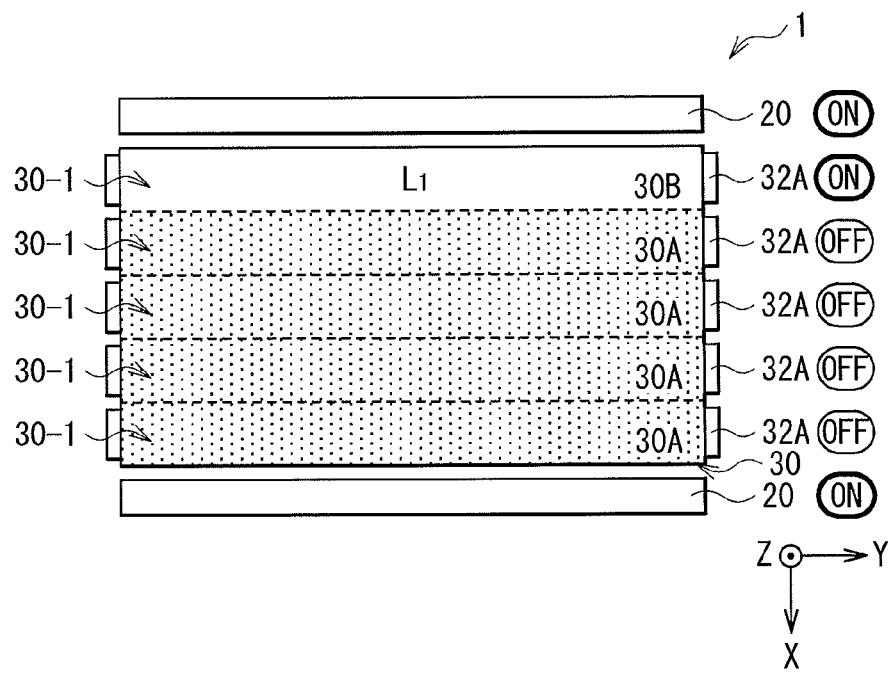
FIG. 10 is a schematic diagram for explaining scanning in the scattering region in the light modulation device.
Figure 10B:
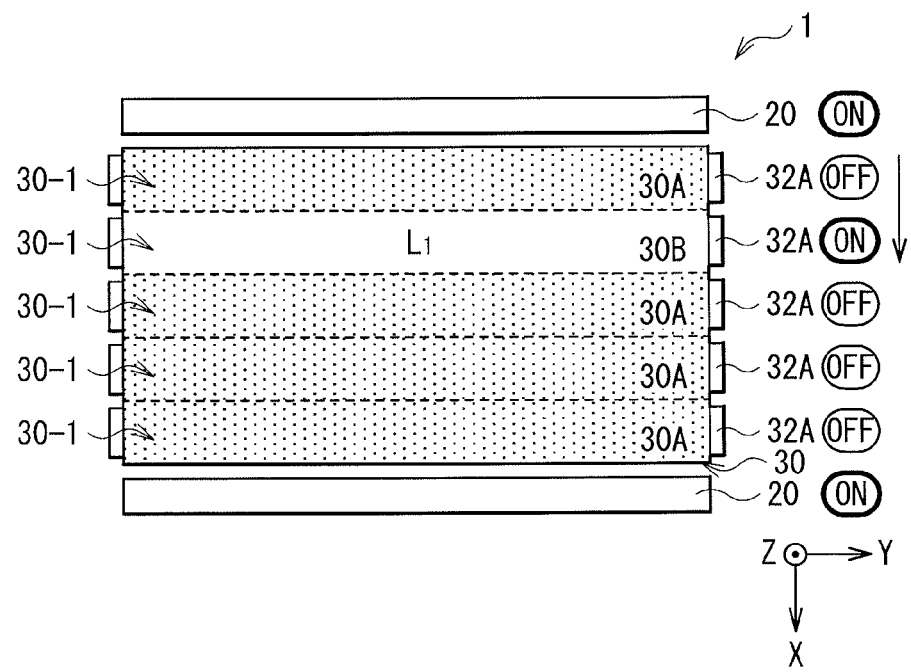
Figure 11A:
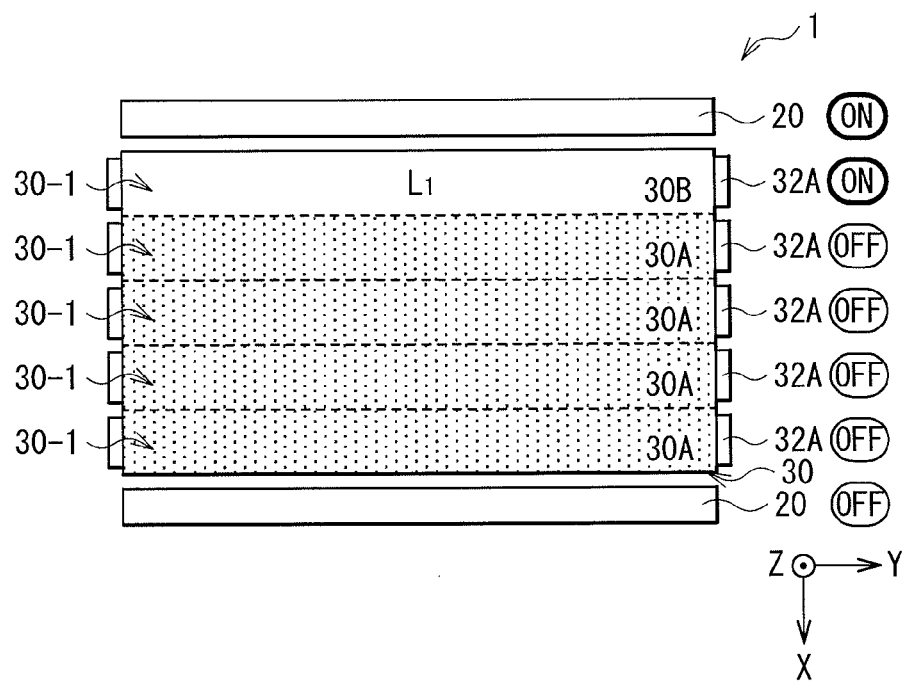
FIG. 11 is a schematic diagram for explaining scanning in the scattering region in the light modulation device.
Figure 11B:
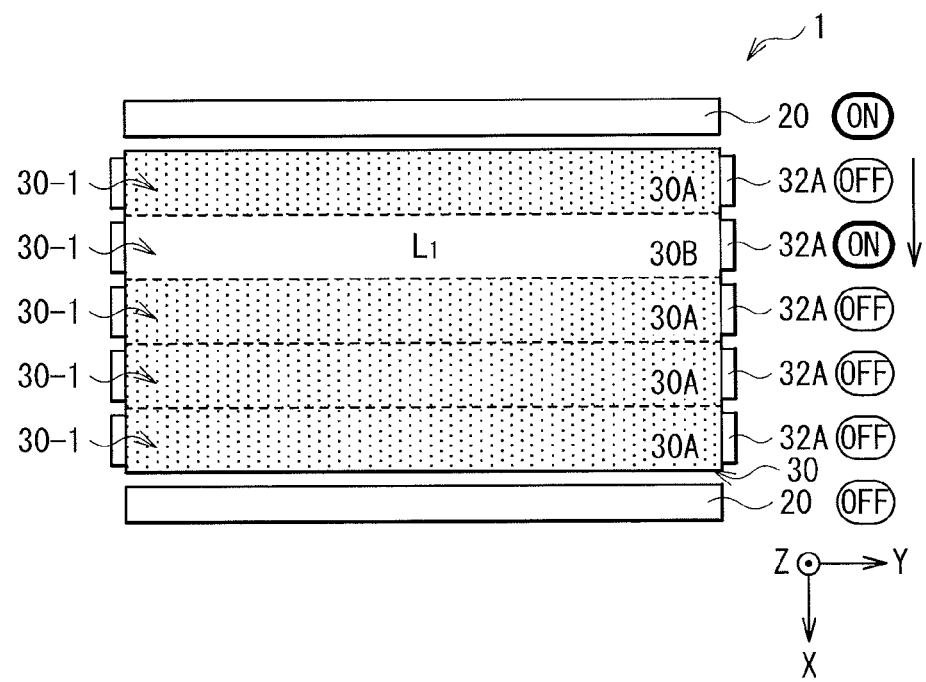
Figure 12A:
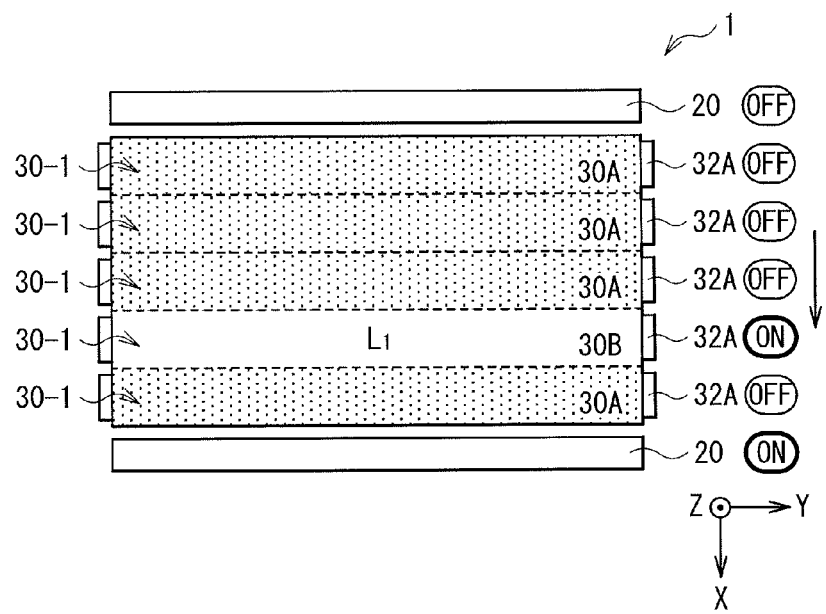
FIG. 12 is a schematic diagram for explaining scanning in the scattering region in the light modulation device.
Figure 12B:
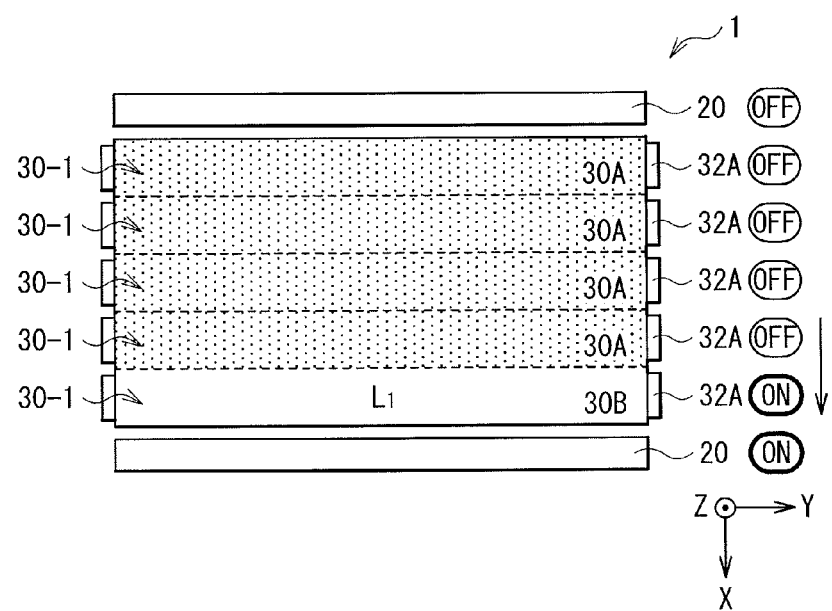

Here, it is preferable that an ordinary refractive index of the bulk 34A be equal to that of the microparticle 34B, and an extraordinary refractive index of the bulk 34A be equal to that of the microparticle 34B. In this case, for example, when a voltage is not applied between the partial electrodes 32A and the upper electrode 36, difference in refractive index is hardly generated in all directions including a front direction and an oblique direction, and high transparency is obtainable. Accordingly, for example, light toward the front direction and light toward the oblique direction are not scattered in the light modulation layer 34 and pass through the light modulation layer 34. As a result, for example, as illustrated in (A) and (B) of FIG. 8, light $L_1$ from the light source 20 (light from the oblique direction) is totally reflected by an interface (an interface between air and the transparent substrate 31 or the light guide plate 10) in a transparent region (a transmissive region 30A) in the light modulation device 30, and luminance of the transmissive region 30A (luminance of black display) is decreased as compared with the case where the light modulation device 30 is not provided (alternate long and short dash line in (B) of FIG. 8). Note that a graph in (B) of FIG. 8 illustrates front luminance measured in a state where a diffuser sheet 41 is provided on the light guide plate 10 as illustrated in (A) of FIG. 8.

Moreover, for example, when a voltage is applied between the partial electrodes 32A and the upper electrode 36, the bulk 34A and the microparticle 34B have a configuration in which the direction of the optical axis AX1 is different from (intersects or is orthogonal to) that of the optical axis AX2 as illustrated in FIG. 7. In addition, for example, when a voltage is applied between the partial electrodes 32A and the upper electrode 36, the microparticle 34B has a configuration in which the optical axis AX2 is parallel (or substantially parallel) to the light incident surface 10A of the light guide plate 10 and is parallel to (or substantially parallel) to the normal of the transparent substrate 31. In other words, when a voltage is applied between the partial electrodes 32A and the upper electrode 36, the optical axis AX2 is orthogonal (or substantially orthogonal) to a surface including the partial electrodes 32A or the upper electrode 36.

Accordingly, when a voltage is applied between the partial electrodes 32A and the upper electrode 36, in the light modulation layer 34, difference in refractive index is increased in all directions in a plane parallel to the light incident surface 10A, and high scattering property is obtainable. Therefore, for example, the light toward the front direction and the light toward the oblique direction are scattered in the light modulation layer 34. As a result, for example, as illustrated in (A) and (B) of FIG. 8, the light $L_1$ from the light source 20 (the light from the oblique direction) passes through the interface (the interface between air and the transparent substrate 31 or the light guide plate 10) in a region (a scattering region 30B) in a scattering state in the light modulation device 30, and the light that has passed to the reflector 40 side is reflected by the reflector 40 and passes through the light modulation device 30. Therefore, luminance of the scattering region 30B is extremely high as compared with the case where the light modulation device 30 is not provided (an alternate long and short dash line in (B) of FIG. 8), and luminance of partial white display (luminance enhancement) is increased by a decreased amount of luminance of the transmissive region 30A.

Note that the ordinary refractive index of the bulk 34A may be slightly different from that of the microparticle 34B due to, for example, manufacturing error, and the difference therebetween is preferably 0.1 or less, and is more preferably 0.05 or less. In addition, the extraordinary refractive index of the bulk 34A may also be slightly different from that of the microparticle 34B due to, for example, manufacturing error, and the difference therebetween is preferably 0.1 or less, and is more preferably 0.05 or less.

In addition, the difference in refractive index (=the extraordinary refractive index−the ordinary refractive index) of the bulk 34A and the difference in refractive index (=the extraordinary refractive index−the ordinary refractive index) of the microparticle 34B are preferably as large as possible, are preferably 0.05 or more, and are more preferably 0.1 or more, and are still more preferably 0.15 or more. This is because when the difference in the refractive index of each of the bulk 34A and the microparticle 34B is large, the scattering power of the light modulation layer 34 is increased to easily disrupt light guiding condition, and the light from the light guide plate 10 is easily extracted.

Moreover, a response speed to the electric field of the bulk 34A is different from that of the microparticle 34B. The bulk 34A has, for example, a streaky structure or a porous structure that does not respond to the electric field, or has a rod-like structure having a response speed lower than that of the microparticle 34B. For example, the bulk 34A is formed of a polymer material obtained by polymerization of a low-molecular monomer. For example, the bulk 34A is formed by polymerizing a material (for example, monomer) that is aligned along the alignment direction of the microparticle 34B or the alignment direction of the alignment films 33 and 35 and has alignment property and polymerizability, by heat or light or both.

On the other hand, for example, the microparticle 34B is configured to contain a liquid crystal material mainly, and has a response speed higher than that of the bulk 34A. The liquid crystal material (liquid crystal molecule) contained in the microparticle 34B is, for example, a rod-like molecule. As the liquid crystal molecule contained in the microparticle 34B, a liquid crystal molecule having positive dielectric constant anisotropy (so-called positive liquid crystal) is preferably used.

Here, when a voltage is not applied between the partial electrodes 32A and the upper electrode 36, the longitudinal direction of the liquid crystal molecule is parallel to the optical axis AX1 in the microparticle 34B. At this time, the longitudinal axis of the liquid crystal molecule in the microparticle 34B is parallel (or substantially parallel) to the light incident surface 10A of the light guide plate 10 and is parallel (or substantially parallel) to the surface of the transparent substrate 31. In addition, when a voltage is applied between the partial electrodes 32A and the upper electrode 36, the longitudinal direction of the liquid crystal molecule intersects (or is orthogonal to) the optical axis AX1 in the microparticle 34B. At this time, the longitudinal axis of the liquid crystal molecule in the microparticle 34B is parallel (or substantially parallel) to the light incident surface 10A of the light guide plate 10 and is parallel (or substantially parallel) to the normal of the transparent substrate 31.

As the above-described monomer having the alignment property and the polymerizability, although a material that has optical anisotropy and is combined with a liquid crystal is sufficient, in the present embodiment, a low-molecular monomer to be cured by ultraviolet ray is preferable. Since it is preferable that the direction of optical anisotropy of the liquid crystal coincide with the direction of the optical anisotropy of the material (polymer material) formed by polymerization of the low-molecular monomer in the state of no-voltage application, the liquid crystal and the low-molecular monomer are preferably aligned in the same direction before ultraviolet curing. In the case where a liquid crystal is used as the microparticle 34B, when the liquid crystal is a rod-like molecule, it is preferable that the shape of the monomer material to be used also have a rod-like shape. As described above, it is preferable to use a material having both of polymerizability and liquid crystallinity as a monomer material, and the material preferably contains, as the polymerizable functional group, one or more functional groups selected from the group consisting of acrylate group, methacrylate group, acryloyloxy group, methacryloyloxy group, vinyl ether group, and epoxy group. These functional groups may be polymerized by irradiation of ultraviolet ray, infrared ray, or an electron beam, or heating. To suppress deterioration in alignment property at the time of ultraviolet ray irradiation, a polyfunctionalized liquid crystal material may be added. When the bulk 34A has the above-described streaky structure, bifunctional liquid-crystalline monomer is preferably used as a material of the bulk 34A. Moreover, monofunctional monomer may be added in order to adjust temperature exhibiting liquid crystallinity or trifunctional monomer may be added in order to improve crosslink density, to the material of the bulk 34A.

For example, the drive circuit 50 controls the magnitude of the voltage applied to a pair of electrodes (the partial electrode 32A and the upper electrode 36) of each of the light modulation cells 30-1 so that the optical axis AX2 of the microparticle 34B is parallel or substantially parallel to the optical axis AX1 of the bulk 34A in a certain light modulation cell 30-1 and the optical axis AX2 of the microparticle 34B intersects or is orthogonal to the optical axis AX1 of the bulk 34A in the other light modulation cells 30-1. In other words, the drive circuit 50 allows the directions of the optical axes AX1 and AX2 of the bulk 34A and the microparticle 34B to coincide (or substantially coincide) with each other or to be different from each other (or be orthogonal to each other) through electric field control.

Further, the drive circuit 50 sequentially drives the plurality of partial electrodes 32A by a predetermine unit to scan the region exhibiting scattering property (the scattering region 30B) of the light modulation layer 34 in a direction orthogonal to the light incident surface 10A. Accordingly, the drive circuit 50 scans the light that is scattered by the scattering region 30B and emitted from the upper surface of the backlight 1 to the outside, in a direction orthogonal to the light incident surface 10A during a process in which light emitted from the light source 20 propagates through the light guide plate.

FIGS. 9(A) and 9(B) to FIGS. 12(A) and 12(B) schematically illustrate a state in which the scattering region 30B is scanned in a direction orthogonal to the light incident surface 10A. For example, as illustrated in FIGS. 9(A) and 9(B) and FIGS. 10(A) and 10(B), the drive circuit 50 sequentially drives the plurality of partial electrodes 32A on a predetermined unit basis to scan the scattering region 30B (the light emission region) in the direction orthogonal to the light incident surface 10A in a state where all of the light sources 20 in the backlight 1 are turned on. Incidentally, FIGS. 9(A) and 9(B) and FIGS. 10(A) and 10(B) illustrate a case where the plurality of partial electrodes 32A are sequentially driven line by line in a positive direction of the X axis.

When one light source 20 is provided in each of the two side surfaces of the light guide plate 10, the drive circuit 50 may turn off or darken one of the light sources 20 depending on a distance of the partial electrode 32A to be driven from the light source 20. For example, the drive circuit 50 may make the light source 20 closer to the partial electrode 32A to be driven of the two light sources 20 brighter than the light source 20 farther from the partial electrode 32A to be driven of the two light sources 20, and may make the light source 20 farther from the partial electrode 32A to be driven of the two light sources 20 darker than the light source 20 closer to the partial electrode 32A to be driven of the two light sources 20.

For example, as illustrated in FIGS. 11(A) and 11(B) and FIGS. 12(A) and 12(B), the drive circuit 50 may turn on the light source 20 closer to the partial electrode 32A to be driven of the two light sources 20, and may turn off the light source 20 farther from the partial electrode 32A to be driven of the two light sources 20, while sequentially driving the plurality of partial electrodes 32A on the predetermined unit basis. In other words, when the partial electrode 32A to be driven is located closer to one (for convenience, referred to as a light source A) of the light sources 20, the drive circuit 50 may turn on only the light source A, and when the partial electrode 32A to be driven is located closer to the other (for convenience, referred to as a light source B) of the light sources 20, the drive circuit 50 may turn on only the light source B. In such a case, an amount of light propagating through the region exhibiting the transparency (the transmissive region 30A) of the light modulation layer 34 is decreased so that black luminance is allowed to be decreased.

In addition, for example, although not illustrated, the drive circuit 50 may turn on the light source 20 farther from the partial electrode 32A to be driven of the two light sources 20 darker than the light source 20 closer to the partial electrode 32A to be driven of the two light sources 20, after turning on both of the two light sources 20. Also in this case, the amount of the light propagating through the region exhibiting the transparency (the transmissive region 30A) of the light modulation layer 34 is decreased by the decreased light amount of one of the light sources 20 so that the black luminance is allowed to be decreased.

Hereinafter, a method of manufacturing the backlight 1 of the embodiment will be described with reference to FIGS. 13(A) to 13(C) to FIGS. 15(A) to 15(C).

Figure 13A:
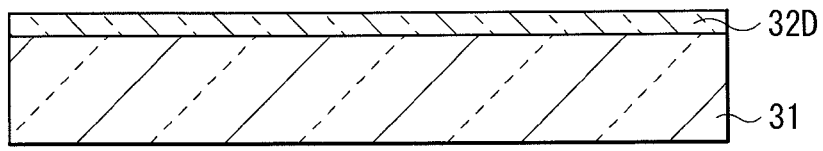
FIG. 13 is a sectional diagram for explaining processes of manufacturing the backlight of FIG. 1.
Figure 13B:
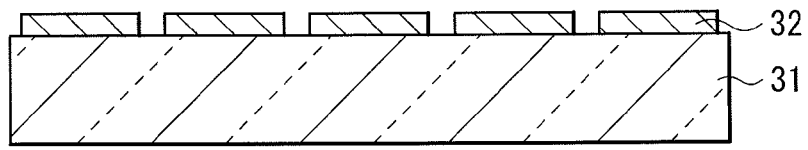

At first, a transparent conductive film 32D made of, for example, ITO is formed on the transparent substrate 31 configured of a glass substrate or a plastic film substrate (FIG. 13(A)). Then, after a patterned resist layer (not illustrated) is formed on the transparent conductive film 32D, the transparent conductive film 32D is selectively etched with use of the resist layer as a mask. As a result, the lower electrode 32 is formed (FIG. 13(B)).

Figure 13C:
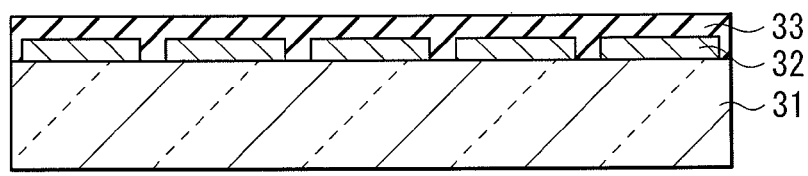

Next, the alignment film 33 is applied on the entire surface, followed by drying and firing (FIG. 13(C)). When a polyimide-based material is used as the alignment film 33, NMP (N-methyl-2-pyrroridone) is frequently used as a solvent, and at this time, a temperature of about 200° C. is necessary in the atmosphere. Note that, in this case, when a plastic substrate is used as the transparent substrates 31 and 37, the alignment film 33 may be dried in a vacuum at 100° C. and fired. After that, rubbing treatment is performed on the alignment film 33. As a result, the alignment film 33 can function as an alignment film for horizontal alignment.

Figure 14A:
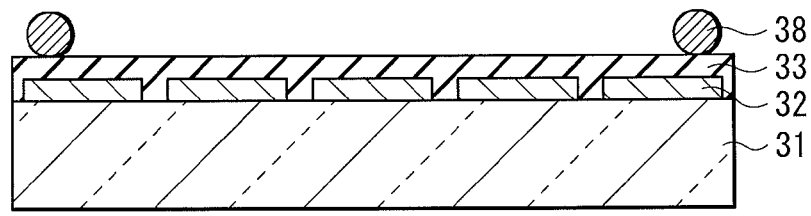
FIG. 14 is a sectional diagram for explaining manufacturing processes following the processes of FIG. 13.
Figure 14B:
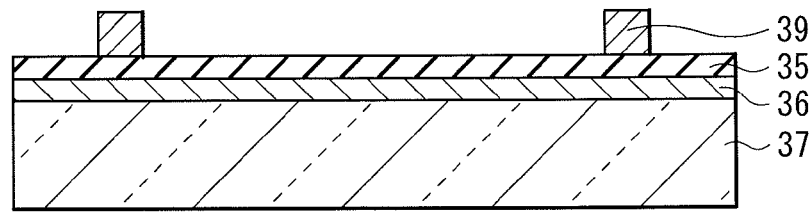

Next, spacers 38 for forming a cell gap are spread on the alignment film 33 by a dry method or a wet method (FIG. 14(A)). Note that, when the light modulation cell 30-1 is formed by vacuum bonding method, the spacers 38 may be mixed into a mixture to be dropped. In addition, instead of the spacers 38, column spacers may be formed by photolithography.

Subsequently, a seal agent pattern 39 for bonding and for preventing leakage of liquid crystal is applied, for example, in a frame shape on the alignment film 35 that has been fabricated by a method similar to that described above (FIG. 14(B)). The seal agent pattern 39 is formed by a dispenser method or a screen printing method.

Although the vacuum bonding method (one drop fill method, ODF method) will be described below, the light modulation cell 30-1 may be formed by a vacuum injection method or a roll bonding system.

Figure 14C:
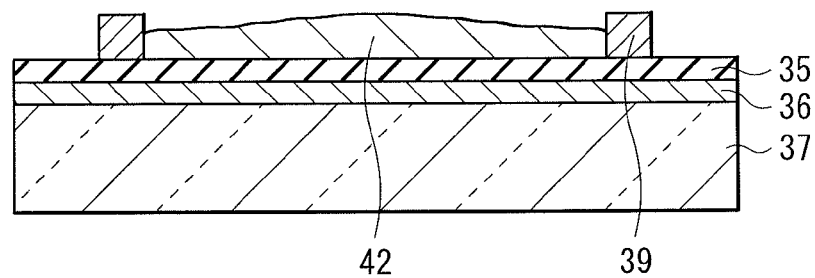

First, a mixture 42 of liquid crystal and monomer corresponding to a volume that is determined from the cell gap, a cell area, and the like is dropped uniformly in a plane (FIG. 14(C)). Although a precise dispenser of linear guide system is preferably used for dropping the mixture 42, the seal agent pattern 39 may be used as a bank and a dye coater or the like may be used.

The above-described material may be used for the liquid crystal and the monomer, and the weight ratio of the liquid crystal and the monomer is 98:2 to 50:50, is preferably 95:5 to 75:25, and is more preferably 92:8 to 85:15. The drive voltage is allowed to be decreased by increasing the rate of the liquid crystal, however, if the liquid crystal is excessively increased, whiteness tends to be lowered at the time of voltage application, or transparency is tends to be deteriorated due to lowering of response speed after voltage off.

The mixture 42 is added with a polymerization initiator, in addition to the liquid crystal and the monomer. The monomer ratio of the polymerization initiator to be added is adjusted within a range of 0.1 to 10 wt % depending on the wavelength of ultraviolet ray to be used. The mixture 42 may be added with a polymerization inhibitor, a plasticizer, a viscosity modifier, and the like, in addition thereto. When the monomer is in a solid or a gel at room temperature, a metal cap, a syringe, and a substrate are preferably warmed.

Figure 15A:
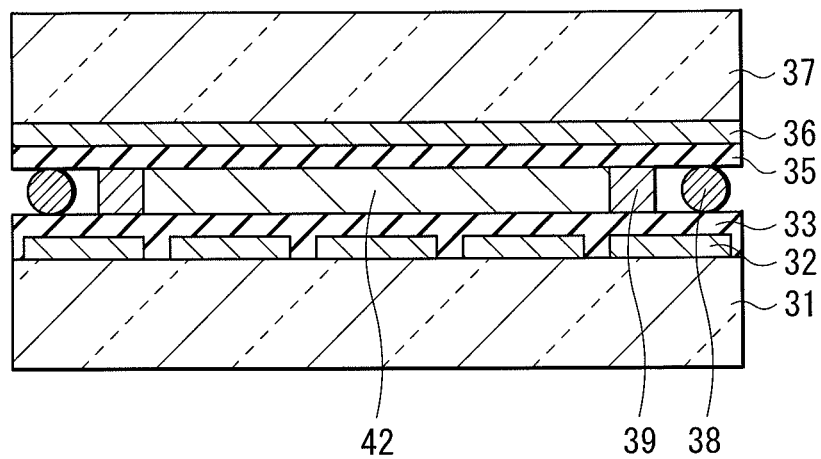
FIG. 15 is a sectional diagram for explaining manufacturing processes following the processes of FIG. 14.
Figure 15B:
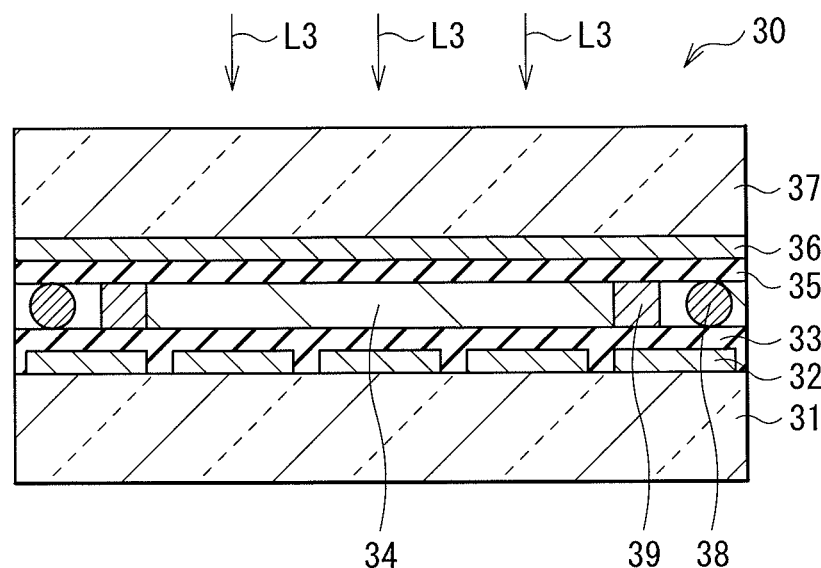

After the transparent substrate 31 and the transparent substrate 37 are placed on a vacuum bonding machine (not illustrated), evacuation and bonding are performed (FIG. 15(A)). After that the bonded body is released in the air, and the cell gap is uniformized by uniform pressurization at atmosphere pressure. The cell gap is arbitrarily selectable based on relationship between white luminance (whiteness) and the drive voltage, and is 5 to 40 µm, is preferably 6 to 20 µm, and is more preferably 7 to 10 µm.

After bonding, it is preferable to perform alignment treatment if necessary (not illustrated). When light leakage occurs at the time of inserting the bonded cell between crossed-Nicols polarizers, the cell is subjected to heat treatment for a certain time or is left at room temperature to be aligned. After that, ultraviolet ray L3 is irradiated to polymerize the monomer, and thus polymer is formed (FIG. 15(B)). In this way, the light modulation device 30 is manufactured.

It is preferable that the temperature of the cell be prevented from being varied during irradiation of the ultraviolet ray. It is preferable to use an infrared cut filter, and use a UV-LED or the like as a light source. The illuminance of the ultraviolet ray affects the structure of the composite material, and thus the illuminance is preferably adjusted based on the liquid crystal material to be used, the monomer material to be used, and the compositions thereof, is preferably within a range of 0.1 to 500 mW/cm$^2$, and is more preferably within a range of 0.5 to 30 mW/cm$^2$. There is a tendency that the drive voltage is decreased as the illuminance of the ultraviolet ray is decreased and preferable illuminance of the ultraviolet ray is selectable in terms of both of productivity and characteristics.

Figure 15C:
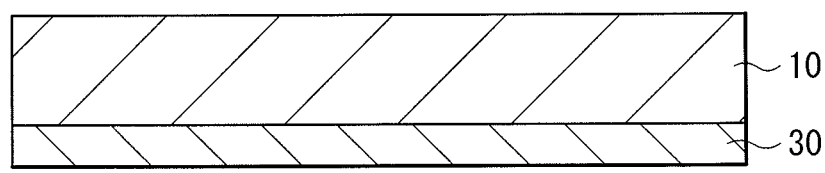

Then, the light modulation device 30 is bonded to the light guide plate 10 (FIG. 15(C)). Although the bonding may be performed through adhesion or bonding, the adhesion or the bonding is preferably performed with use of a material that has a refractive index as close to that of the light guide plate 10 and that of the substrate material of light modulation device 30 as possible. Finally, lead wire (not illustrated) is attached to the lower electrode 32 and the upper electrode 36. In this way, the backlight 1 of the present embodiment is manufactured.

As described above, the process in which the light modulation device 30 is fabricated and the light modulation device 30 is finally bonded to the light guide plate 10 has been described, however, the transparent substrate 37 formed with the alignment film 35 may be previously bonded to the surface of the light guide plate 10 and then the backlight 1 may be fabricated. Moreover, the backlight 1 may be fabricated by a single wafer system or a roll to roll system.

Next, functions and effects of the backlight 1 of the present embodiment will be described.

In the backlight 1 of the present embodiment, the voltage is applied between the partial electrode 32A of each of the light modulation cells 30-1 and the upper electrode 36 so that the optical axis AX2 of the microparticle 34B is parallel or substantially parallel to the optical axis AX1 of the bulk 34A in a certain light modulation cell 30-1 and the optical axis AX2 of the microparticle 34B intersects or is orthogonal to the optical axis AX1 of the bulk 34A in the other light modulation cell 30-1. As a result, the light that has been emitted from the light source 20 and has entered the light guide plate 10 passes through the transmissive region 30A of the light modulation device 30 where the optical axis AX1 is parallel or substantially parallel to the optical axis AX2. In addition, the light that has been emitted form the light source 20 and has entered the light guide plate 10 is scattered in the scattering region 30B of the light modulation device 30 where the optical axis AX1 intersects or is orthogonal to the optical axis AX2. Light that has passed through the lower surface of the scattering region 30B of the scattered light is reflected by the reflector 40 to return to the light guide plate 10 again, and then is emitted from the upper surface of the backlight 1. In addition, light toward the upper surface of the scattering region 30B of the scattered light passes through the light guide plate 10, and then is emitted from the upper surface of the backlight 1. As described above, in the present embodiment, light is scarcely emitted from the upper surface of the transmissive region 30A and the light is emitted from the upper surface of the scattering region 30B. In this way, the modulation ratio in the front direction is increased.

Typically, the PDLC is formed by mixing a liquid crystal material and an isotropic low-molecular material and causing phase separation by ultraviolet irradiation, drying of a solvent, etc., and has a composite layer in which microparticles of the liquid crystal material are dispersed in a polymer material. The liquid crystal material in the composite layer exhibits scattering property because the liquid crystal material directs in random directions at the time of no-voltage application; however the liquid crystal material aligns in an electric field direction at the time of voltage application. Accordingly, the liquid crystal material exhibits high transparency in the front direction (in the normal direction of the PDLC) when the ordinary refractive index of the liquid crystal material is equal to the refractive index of the polymer material. However, in the liquid crystal material, in the oblique direction, difference between the extraordinary refractive index of the liquid crystal and the polymer material is remarkable, and this results in expression of scattering property in the oblique direction even when transparency is expressed in the front direction.

Usually, a light modulation device using the PDLC frequently has a structure in which the PDLC is sandwiched between two glass plates that have a front surface formed with a transparent conductive film. When light obliquely enters, from the air, the light modulation device having the above-described structure, the light that has entered the light modulation device in the oblique direction is refracted by difference in refractive index between the air and the glass plate, and enters the PDLC at a smaller angle. Therefore, in such a light modulation device, large scattering does not occur. For example, when light enters the light modulation device from the air at an angle of 80 degrees, the entering angle of the light to the PDLC is decreased to about 40 degrees by refraction at the glass interface.

However, in an edge light system using a light guide plate, since light enters through the light guide plate, the light passes through the PDLC at a large angle of about 80 degrees. Therefore, difference between the extraordinary refractive index of the liquid crystal material and the refractive index of the polymer material is large, and further the light passes through the PDLC at larger angle, and optical path subjected to scattering is also increased accordingly. For example, when microparticles of a liquid crystal material that has an ordinary refractive index of 1.5 and an extraordinary refractive index of 1.65 are dispersed into a polymer material having a refractive index of 1.5, difference in refractive index is not generated in the front direction (the normal direction of the PDLC); however the difference in refractive index is increased in the oblique direction. Therefore, scattering property in the oblique direction cannot be decreased so that viewing angle characteristics are deteriorated. Further, when an optical film such as a diffuser film is provided on the light guide plate, obliquely-leaked light is diffused also in the front direction by the diffuser film or the like. Therefore, light leakage in the front direction is increased and the modulation ratio in the front direction is lowered.

Moreover, it is conceivable that a holographic PDLC (H-PDLC) is used instead of the above-described PDLC. In the H-PDLC, when a voltage is applied to some regions of the H-PDLC, the direction of liquid molecules existing in that regions is changed. A region (non-transition region) where a voltage is not applied and the direction of the liquid molecules is not changed is present around the region (transition region) where the direction of the liquid crystal molecules is changed in such a way, and a boundary between the two kinds of regions configures a diffraction grating. The diffraction grating diffracts a p-polarized wave and allows an s-polarized wave to pass therethrough. Therefore, a p-polarized wave of the light that has propagated through the light guide plate is diffracted by the diffraction grating and the diffracted light is then extracted to the outside, however an s-polarized wave of the light that has propagated through the light guide plate passes through the diffraction grating. Accordingly, in the H-PDLC, the modulation ratio in the front direction is low in principle.

On the other hand, in the present embodiment, since the bulk 34A and the microparticle 34B are formed to mainly contain respective optical anisotropic materials in the light modulation device 30, the scattering property is decreased and the transparency is improved in the oblique direction. For example, in a region where the bulk 34A and the microparticle 34B mainly contain respective optical anisotropic materials whose ordinary refractive indices are equal to each other and whose extraordinary refractive indices are also equal to each other and a voltage is not applied between the partial electrodes 32A and the upper electrode 36, the directions of the optical axes thereof coincide or substantially coincide with each other. Therefore, difference in refractive index is decreased or eliminated in all directions including the front direction (the normal direction of the light modulation device 30) and the oblique direction, and higher transparency is obtainable. As a result, light leakage in a region where a viewing angle is large is decreased or substantially eliminated, and viewing angle characteristics are improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed by polymerization of the liquid crystalline monomer. As a result, since the refractive indices are coincident with each other in all directions, in such a case, a state with higher transparency is achievable and the viewing angle characteristics are further improved.

In addition, in the present embodiment, for example, as illustrated in (A) and (B) of FIG. 8, the luminance of the transmissive region 30A (the luminance of black display) is lower than that in the case where the light modulation device 30 is not provided (alternate long and short dash line in (B) of FIG. 8). On the other hand, the luminance of the scattering region 30B is extremely higher than that in the case where the light modulation device 30 is not provided (alternate long and short dash line in (B) of FIG. 8), and the luminance of partial white display (luminance enhancement) is increased by a decreased amount of the luminance of the transmissive region 30A.

Incidentally, the luminance enhancement is a technique to enhance luminance when partial white display is performed, as compared with the case of entire white display. This is a technique generally used for CRT, PDP, and the like. In a liquid crystal display, however, a backlight uniformly emits light as a whole irrespective of an image so that partial enhancement of luminance is difficult. Incidentally, when the backlight is configured as an LED backlight in which a plurality of LEDs are two-dimensionally arranged, the LEDs are allowed to be partially turned off. However, in such a case, diffusion light from a dark region where the LEDs are turned off is absent, and thus the luminance is lowered as compared with the case where all of the LEDs are turned on. In addition, although it is possible to increase the luminance by increasing a current flowing through the LEDs partially turned on, in such a case, large current flows through the LEDs in an extremely short time, and thus issues are remained in terms of load of circuits and reliability.

On the other hand, in the present embodiment, since the bulk 34A and the microparticle 34B are formed to mainly contain respective optical anisotropic materials in the light modulation device 30, the scattering property in the oblique direction is suppressed and leakage of light from the light guide plate in a dark state is suppressed. Therefore, the light propagating through the light guide plate 10 propagates from a partial dark region to a partial bright region with slight optical loss so that luminance enhancement is achievable without increasing power supplied to the backlight 1. As a result, high luminance is achievable.

Moreover, in the present embodiment, when the horizontal alignment film has the above-described pretilt function, in a region where a voltage is not applied between the partial electrodes 32A and the upper electrode 36, the optical axis AX2 of the microparticle 34B is parallel (or substantially parallel) to the light incident surface 10A of the light guide plate 10, and intersects the surface of the transparent substrate 31 at a predetermined pretilt angle. Specifically, the liquid crystal molecule contained in the microparticle 34B is aligned in a state of being inclined at the predetermined pretilt angle in a plane parallel to the light incident surface 10A. Therefore, when a voltage is applied between the partial electrodes 32A and the upper electrode 36, the liquid crystal molecule contained in the microparticle 34B does not stand up in a random direction, and stands up in the plane parallel to the light incident surface 10A. At this time, the optical axis AX1 of the bulk 34A intersects or is orthogonal to the optical axis AX2 of the microparticle 34B in the plane parallel to the light incident surface 10A. Accordingly, in the region where a voltage is applied between the partial electrodes 32A and the upper electrode 36, difference in refractive index is increased in all directions including the front direction (the normal direction of the light modulation device 30) and the oblique direction, and high scattering property is obtainable. As a result, display luminance is allowed to be improved. In addition, luminance is allowed to be further improved by the effect of the above-described luminance enhancement.

Moreover, in the present embodiment, the plurality of partial electrodes 32A arranged in the direction orthogonal to the light incident surface 10A are sequentially driven on the predetermined unit basis. Accordingly, during the process in which the light emitted from the light source 20 propagates through the light guide plate 10, the region exhibiting the scattering property (the scattering region 30B) of the light modulation layer 34 is scanned in the direction orthogonal to the light incident surface 10A. As a result, the light that is scattered in the scattering region 30B and is to be emitted from the upper surface of the backlight 1 to the outside is scanned in the direction orthogonal to the light incident surface 10A. At this time, since scan driving of the light source 20 is not performed, luminance higher than that in the existing method in which scan driving of a light source is performed is obtainable by the effect of the above-described luminance enhancement. In addition, in the present embodiment, as described above, since the scan driving of the light source 20 is not performed, it is rarely necessary to consider inrush power generated when a large power is supplied to the light source in an extremely short time to perform the scan driving, and reliability of the circuit board is not impaired.

As described above, in the present embodiment, the light emitted from the upper surface of the backlight 1 is scanned by scanning the scattering region 30B of the light modulation layer 34 instead of the scan driving of the light source 20, and thus high luminance, low power consumption, high reliability of the circuit board are all achievable at a time in scan system.

<2. Second Embodiment>

Figure 16A:
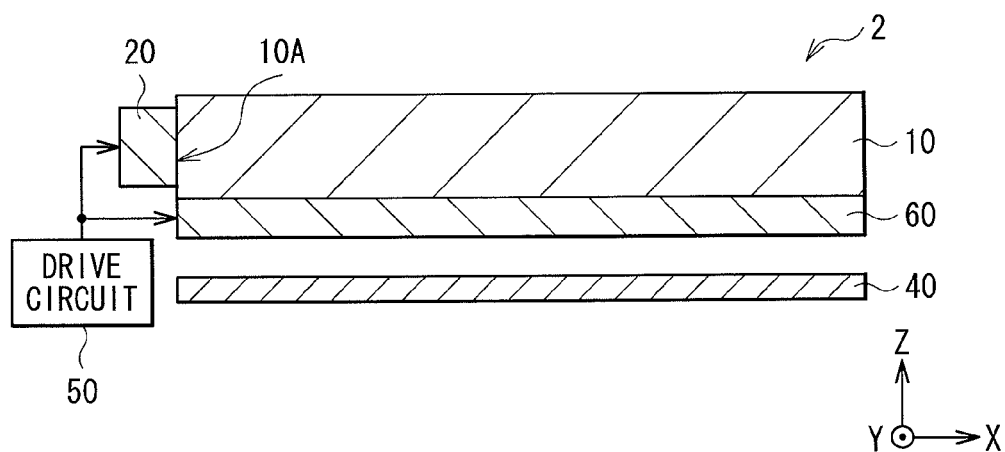
FIG. 16 is a sectional diagram illustrating an example of a configuration of a backlight according to a second embodiment of the invention.
Figure 16B:
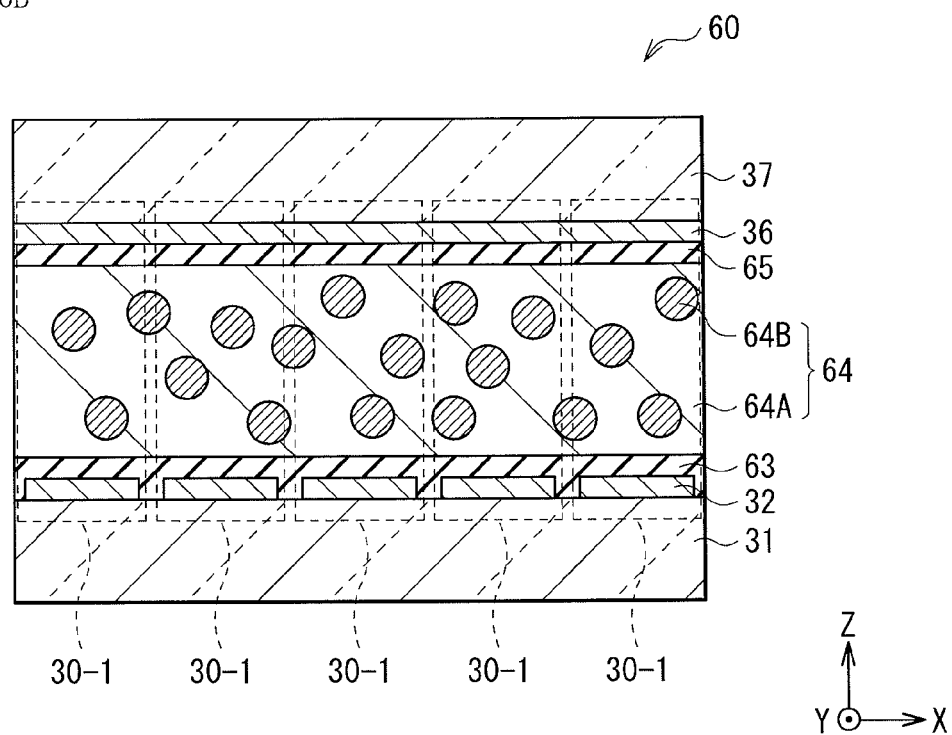

FIG. 16(A) is a sectional diagram illustrating an example of a schematic configuration of a backlight 2 according to a second embodiment of the invention. The backlight 2 corresponds to a specific example of a lighting unit of the invention. FIG. 16(B) is a sectional diagram illustrating an example of a schematic configuration of a light modulation device 60 included in the backlight 2 of FIG. 16(A). Note that FIGS. 16(A) and 16(B) are schematic illustration, and the illustration may not be the same as actual dimensions and shapes.

The configuration of the backlight 2 of the present embodiment is different from the configuration of the backlight 1 according to the first embodiment in terms of being provided with the light modulation device 60 instead of the light modulation device 30. Thus, hereinafter, differences with the above-described embodiment will be described mainly, and the description for common points to the above-described embodiment will be arbitrarily omitted.

In the present embodiment, the light modulation device 60 is tightly adhered to the back (the lower surface) of the light guide plate 10 without an air layer in between, and is adhered to the back of the light guide plate 10 with, for example, an adhesive agent (not illustrated) in between. For example, as illustrated in FIG. 16(B), the light modulation device 60 is configured by arranging the transparent substrate 31, the lower electrode 32, an alignment film 63, a light modulation layer 64, an alignment film 65, the upper electrode 36, and the transparent substrate 37 in order from the reflector 40 side.

For example, the alignment films 63 and 65 align a liquid crystal and a monomer used for the light modulation layer 64. For example, kinds of the alignment films include a vertical alignment film and a horizontal alignment film; however in the present embodiment, the vertical alignment film is used for the alignment films 63 and 65. As the vertical alignment film, a silane coupling material, polyvinyl alcohol (PVA), a polyimide-based material, a surfactant, and the like may be used. In addition, when a plastic film is used as the transparent substrates 31 and 37, a silane coupling material capable of being used with an alcohol-based solvent as the alignment films 63 and 65 is preferably used because firing temperature after the alignment films 63 and 65 are applied to the surface of the transparent substrates 31 and 37, respectively, is preferably as low as possible in manufacturing process.

Note that a vertical alignment film that has a function to provide pretilt to a liquid crystal molecule adjacent to the vertical alignment film is preferably used. For example, rubbing may be used as a method of developing a pretilt function of the vertical alignment film. For example, the above-described vertical alignment film preferably has a function to allow the longitudinal axis of the liquid crystal molecule adjacent to the vertical alignment film to intersect with the normal of the vertical alignment film at a slight angle in a plane parallel to the light incident surface 10A. The vertical alignment film having such a function is achievable by, for example, making the rubbing direction parallel to the light incident surface 10A.

However, when the vertical alignment film is used as the alignment films 63 and 65, as a liquid crystal molecule contained in a microparticle 64B described later, a liquid crystal molecule having negative dielectric constant anisotropy (so-called negative liquid crystal) is preferably used.

Next, the light modulation layer 64 of the present embodiment is described. For example, as illustrated in FIG. 16(B), the light modulation layer 64 is a composite layer including a bulk 64A and a plurality of microparticles 64B dispersed into the bulk 64A. The bulk 64A and the microparticles 64B have optical anisotropy.

Figure 17:
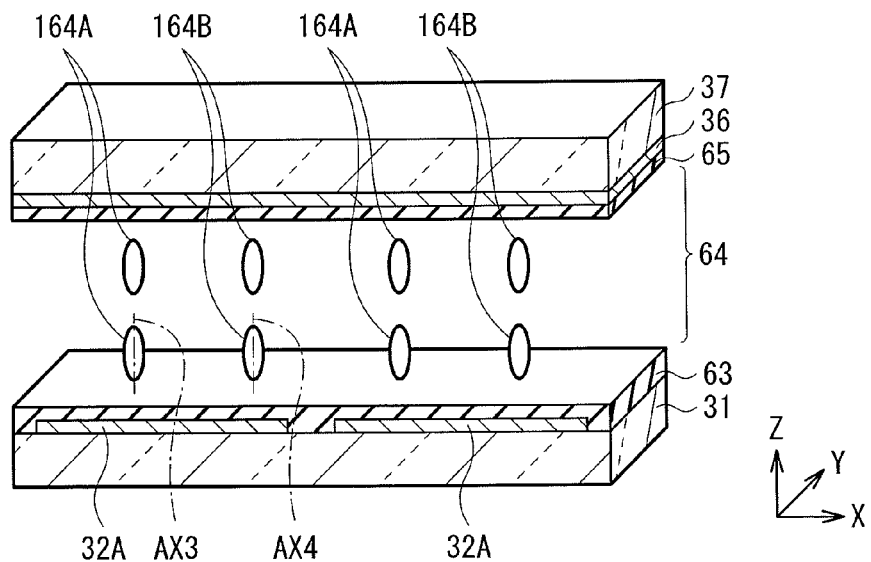
FIG. 17 is a schematic diagram for explaining a configuration when a voltage is not applied to a light modulation device of FIG. 16.

FIG. 17 schematically illustrates an example of an alignment state in the bulk 64A and the microparticles 64B when a voltage is not applied between the partial electrodes 32A and the upper electrode 36. An ellipsoid 164A in FIG. 17 illustrates an example of an index ellipsoid exhibiting refractive index anisotropy of the bulk 64A when a voltage is not applied between the partial electrodes 32A and the upper electrode 36. An ellipsoid 164B in FIG. 17 illustrates an example of an index ellipsoid exhibiting refractive index anisotropy of the microparticle 64B when a voltage is not applied between the partial electrodes 32A and the upper electrode 36.

Figure 18:
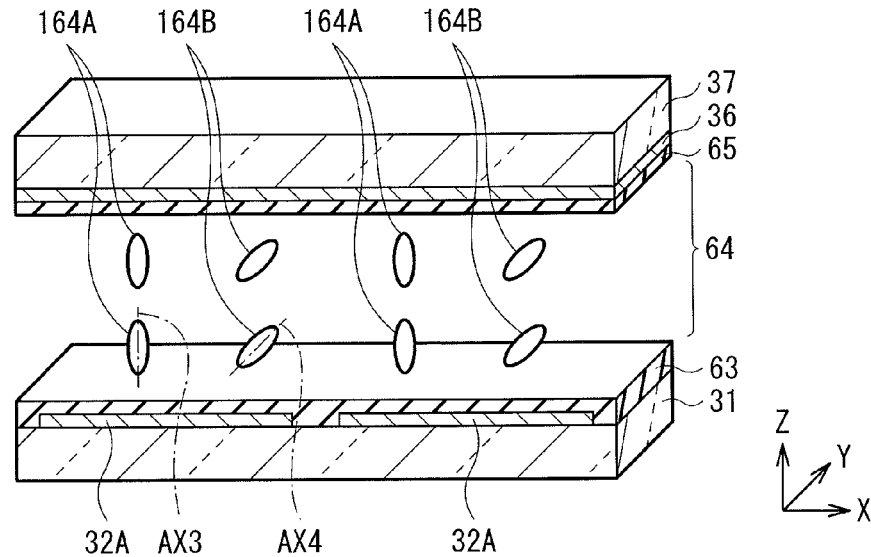
FIG. 18 is a schematic diagram for explaining a configuration when a voltage is applied to the light modulation device of FIG. 16.

FIG. 18 schematically illustrates an example of an alignment state in the bulk 64A and the microparticles 64B when a voltage is applied between the partial electrodes 32A and the upper electrode 36. The ellipsoid 164A in FIG. 18 illustrates an example of an index ellipsoid exhibiting refractive index anisotropy of the bulk 64A when a voltage is applied between the partial electrodes 32A and the upper electrode 36. The ellipsoid 164B in FIG. 18 illustrates an example of an index ellipsoid exhibiting refractive index anisotropy of the microparticle 64B when a voltage is applied between the partial electrodes 32A and the upper electrode 36.

For example, as illustrated in FIG. 17, the bulk 64A and the microparticle 64B have configuration in which a direction of an optical axis AX3 of the bulk 64A (specifically, a longitudinal axis of the ellipsoid 164A) and a direction of an optical axis AX4 of the microparticle 64B (specifically, a longitudinal axis of the ellipsoid 164B) coincide with (are parallel to) each other. Incidentally, the optical axes AX3 and AX4 each indicate a line parallel to a traveling direction of light ray, the line defining a refractive index as one value irrespective of polarization direction. In addition, it is unnecessary for the direction of the optical axis AX3 and the direction of the optical axis AX4 to constantly coincide with each other when a voltage is not applied between the partial electrodes 32A and the upper electrode 36, and the direction of the optical axis AX3 may be deviated in some degree from the direction of the optical axis AX4 due to, for example, manufacturing error.

Moreover, when a voltage is not applied between the partial electrodes 32A and the upper electrode 36, the optical axis AX4 is parallel (or substantially parallel) to the light incident surface 10A of the light guide plate 10 and is parallel (or substantially parallel) to the normal of the surface of the transparent substrate 31. In other words, when a voltage is not applied between the lower electrode 32 and the upper electrode 36, the optical axis AX4 is orthogonal (or substantially orthogonal) to a surface including the lower electrode 32 or the upper electrode 36.

Note that, in the case where the vertical alignment film has the above-described pretilt function, when a voltage is not applied between the partial electrodes 32A and the upper electrode 36, the optical axis AX4 is parallel (or substantially parallel) to the light incident surface 10A of the light guide plate 10, and intersects the normal of the transparent substrate 31 at a predetermined pretilt angle.

On the other hand, the bulk 64A has a configuration in which the optical axis AX3 is fixed irrespective of presence or absence of voltage application between the partial electrodes 32A and the upper electrode 36. Specifically, the optical axis AX3 is parallel (or substantially parallel) to the light incident surface 10A of the light guide plate 10, and is parallel (or substantially parallel) to the normal of the surface of the transparent substrate 31. In other words, when a voltage is not applied between the partial electrodes 32A and the upper electrode 36, the optical axis AX3 is parallel (or substantially parallel) to the optical axis AX4.

Note that, in the case where the vertical alignment film has the above-described pretilt function, the optical axis AX3 is parallel (or substantially parallel) to the light incident surface 10A of the light guide plate 10, and intersects the normal of the transparent substrate 31 at a predetermined pretilt angle. In other words, also in this case, when a voltage is not applied between the partial electrodes 32A and the upper electrode 36, the optical axis AX3 is parallel (or substantially parallel) to the optical axis AX4.

Here, it is preferable that an ordinary refractive index of the bulk 64A be equal to that of the microparticle 64B, and an extraordinary refractive index of the bulk 64A be equal to that of the microparticle 64B. In this case, for example, when a voltage is not applied between the partial electrodes 32A and the upper electrode 36, difference in refractive index is not generated in all directions including a front direction and an oblique direction, and high transparency is obtainable. Accordingly, for example, light toward the front direction and light toward the oblique direction are not scattered in the light modulation layer 64 and pass through the light modulation layer 64. As a result, for example, light from the light source 20 (light from the oblique direction) is totally reflected by an interface (an interface between air and the transparent substrate 31 or the light guide plate 10) in a transparent region (the transmissive region 30A) in the light modulation device 60, and luminance of the transmissive region 30A (luminance of black display) is decreased as compared with the case where the light modulation device 60 is not provided (see (A) and (B) of FIG. 8).

Moreover, for example when a voltage is applied between the partial electrodes 32A and the upper electrode 36, the bulk 64A and the microparticle 64B have a configuration in which the direction of the optical axis AX3 is different from (intersects or is orthogonal to) that of the optical axis AX4 as illustrated in FIG. 18. In addition, for example, when a voltage is applied between the partial electrodes 32A and the upper electrode 36, the microparticle 64B has a configuration in which the optical axis AX4 is parallel (or substantially parallel) to the light incident surface 10A of the light guide plate 10 and is parallel (or substantially parallel) to the surface of the transparent substrate 31. In other words, when a voltage is applied between the partial electrodes 32A and the upper electrode 36, the optical axis AX4 is parallel (or substantially parallel) to a surface including the partial electrodes 32A or the upper electrode 36, and is parallel (or substantially parallel) to the extending direction of the partial electrodes 32A.

Accordingly, when a voltage is applied between the partial electrodes 32A and the upper electrode 36, in the light modulation layer 64, difference in refractive index is increased in all directions in a plane that is parallel to the light incident surface 10A and is orthogonal to the surface of the transparent substrate 31, and high scattering property is obtainable. Therefore, for example, the light toward the front direction and the light toward the oblique direction are scattered in the light modulation layer 64. As a result, for example, the light L from the light source 20 (the light from the oblique direction) passes through the interface (the interface between air and the transparent substrate 31 or the light guide plate 10) of the scattering region 30B, and the light that has passed to the reflector 40 side is reflected by the reflector 40 and passes through the light modulation device 60. Therefore, luminance of the scattering region 30B is extremely high as compared with the case where the light modulation device 60 is not provided, and luminance of partial white display (luminance enhancement) is increased by a decreased amount of luminance of the transmissive region 30A.

Note that the ordinary refractive index of the bulk 64A may be slightly different from that of the microparticle 64B due to, for example, manufacturing error, and the difference therebetween is preferably 0.1 or less, and is more preferably 0.05 or less. In addition, the extraordinary refractive index of the bulk 64A may also be slightly different from that of the microparticle 64B due to, for example, manufacturing error, and the difference therebetween is preferably 0.1 or less, and is more preferably 0.05 or less.

In addition, the difference in refractive index (=the extraordinary refractive index−the ordinary refractive index) of the bulk 64A and the difference in refractive index (=the extraordinary refractive index−the ordinary refractive index) of the microparticle 64B are preferably as large as possible, are preferably 0.05 or more, and are more preferably 0.1 or more, and are still more preferably 0.15 or more. This is because when the difference in the refractive index of each of the bulk 64A and the microparticle 64B is large, the scattering power of the light modulation layer 64 is increased to easily disrupt light guiding condition, and the light from the light guide plate 10 is easily extracted.

Moreover, a response speed to the electric field of the bulk 64A is different from that of the microparticle 64B. The bulk 64A has, for example, a streaky structure or a porous structure that does not respond to the electric field, or has a rod-like structure having a response speed lower than that of the microparticle 64B. For example, the bulk 64A is formed of a polymer material obtained by polymerization of a low-molecular monomer. For example, the bulk 64A is formed by polymerizing material that is aligned along the alignment direction of the microparticle 64B or the alignment direction of the alignment films 63 and 65 and has an alignment property and polymerizability, by heat or light or both. On the other hand, for example, the microparticle 64B is configured to contain a liquid crystal material mainly, and has a response speed sufficiently higher than that of the bulk 64A. The liquid crystal material (liquid crystal molecule) contained in the microparticle 64B is, for example, a rod-like molecule.

Here, when a voltage is not applied between the partial electrodes 32A and the upper electrode 36, the longitudinal direction of the liquid crystal molecule is parallel to the optical axis AX3 in the microparticle 64B. At this time, the longitudinal axis of the liquid crystal molecule in the microparticle 64B is parallel (or substantially parallel) to the light incident surface 10A of the light guide plate 10 and is parallel (or substantially parallel) to the surface of the transparent substrate 31. In addition, when a voltage is applied between the partial electrodes 32A and the upper electrode 36, the longitudinal direction of the liquid crystal molecule intersects (or is orthogonal to) the optical axis AX3 in the microparticle 64B. At this time, the longitudinal axis of the liquid crystal molecule in the microparticle 64B is parallel (or substantially parallel) to the light incident surface 10A of the light guide plate 10 and is parallel (or substantially parallel) to the surface of the transparent substrate 31.

As the above-described monomer having the alignment property and the polymerizability, although a material that has optical anisotropy and is combined with a liquid crystal is sufficient, in the present embodiment, a low-molecular monomer to be cured by ultraviolet ray is preferable. Since it is preferable that the direction of optical anisotropy of the liquid crystal coincide with the direction of the optical anisotropy of the material (polymer material) formed by polymerization of the low-molecular monomer in the state of no-voltage application, the liquid crystal and the low-molecular monomer are preferably aligned in the same direction before ultraviolet curing. In the case where a liquid crystal is used as the microparticle 64B, when the liquid crystal is a rod-like molecule, it is preferable that the shape of the monomer material to be used also have a rod-like shape. As described above, it is preferable to use a material having both of polymerizability and liquid crystallinity as a monomer material, and the monomer material preferably contains, as a polymerizable functional group, one or more functional groups selected from the group consisting of acrylate group, methacrylate group, acryloyloxy group, methacryloyloxy group, vinyl ether group, and epoxy group. These functional groups may be polymerized by irradiation of ultraviolet ray, infrared ray, or an electron beam, or heating. To suppress deterioration in alignment property at the time of ultraviolet ray irradiation, a polyfunctionalized liquid crystal material may be added. When the bulk 64A has the above-described streaky structure, bifunctional liquid-crystalline monomer is preferably used as a material of the bulk 64A. Moreover, monofunctional monomer may be added in order to adjust temperature exhibiting liquid crystallinity or trifunctional monomer may be added in order to improve crosslink density, to the material of the bulk 64A.

For example, the drive circuit 50 controls the magnitude of the voltage applied to a pair of electrodes (the partial electrode 32A and the upper electrode 36) of each of the light modulation cells 30-1 so that the optical axis AX4 of the microparticle 64B is parallel or substantially parallel to the optical axis AX3 of the bulk 64A in a certain light modulation cell 30-1 and the optical axis AX4 of the microparticle 64B intersects or is orthogonal to the optical axis AX3 of the bulk 64A in the other light modulation cell 30-1. In other words, the drive circuit 50 allows the directions of the optical axes AX3 and AX4 of the bulk 64A and the microparticle 64B to coincide (or substantially coincide) with each other or to be different from each other (or be orthogonal to each other) through electric field control.

Further, the drive circuit 50 sequentially drives the plurality of partial electrodes 32A by a predetermine unit to scan the region exhibiting the scattering property (the scattering region 30B) of the light modulation layer 64 in a direction orthogonal to the light incident surface 10A. Accordingly, the drive circuit 50 scans the light that is scattered by the scattering region 30B and emitted from the upper surface of the backlight 2 to the outside, in the direction orthogonal to the light incident surface 10A during the process in which the light emitted from the light source 20 propagates through the light guide plate.

Next, functions and effects of the backlight 2 of the present embodiment will be described.

In the backlight 2 of the present embodiment, a voltage is applied between the partial electrode 32A of each of the light modulation cells 30-1 and the upper electrode 36 so that the optical axis AX4 of the microparticle 64B is parallel or substantially parallel to the optical axis AX3 of the bulk 64A in a certain light modulation cell 30-1 and the optical axis AX4 of the microparticle 64B intersects or is orthogonal to the optical axis AX3 of the bulk 64A in the other light modulation cell 30-1. As a result, the light that has been emitted from the light source 20 and has entered the light guide plate 10 passes through the transmissive region 30A of the light modulation device 60 where the optical axis AX3 is parallel or substantially parallel to the optical axis AX4. In addition, the light that has been emitted form the light source 20 and has entered the light guide plate 10 is scattered in the scattering region 30B of the light modulation device 60 where the optical axis AX3 intersects or is orthogonal to the optical axis AX4. Light that has passed through the lower surface of the scattering region 30B of the scattered light is reflected by the reflector 40 to return to the light guide plate 10 again, and then is emitted from the upper surface of the backlight 2. In addition, light toward the upper surface of the scattering region 30B of the scattered light passes through the light guide plate 10, and then is emitted from the upper surface of the backlight 2. As described above, in the present embodiment, light is scarcely emitted from the upper surface of the transmissive region 30A and the light is emitted from the upper surface of the scattering region 30B. In this way, the modulation ratio in the front direction is increased.

Incidentally, in the present embodiment, since the bulk 64A and the microparticle 64B are formed to mainly contain respective optical anisotropic materials, the scattering property is decreased and the transparency is improved in the oblique direction. For example, in a region where the bulk 64A and the microparticle 64B mainly contain respective optical anisotropy materials whose ordinary refractive indices are equal to each other and whose extraordinary refractive indices are also equal to each other and a voltage is not applied between the partial electrodes 32A and the upper electrode 36, the directions of the optical axes thereof coincide or substantially coincide with each other. Therefore, difference in refractive index is decreased or eliminated in all directions including the front direction (the normal direction of the light modulation device 60) and the oblique direction, and higher transparency is obtainable. As a result, light leakage in a region where a viewing angle is large is decreased or substantially eliminated, and viewing angle characteristics are improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed by polymerization of the liquid crystalline monomer. As a result, since the refractive indices are coincident with each other in all directions, in such a case, a state with higher transparency is achievable and the viewing angle characteristics are further improved.

In addition, in the present embodiment, for example, the luminance of the transmissive region 30A (the luminance of black display) is lower than that in the case where the light modulation device 60 is not provided. On the other hand, the luminance of the scattering region 30B is extremely higher than that in the case where the light modulation device 60 is not provided, and further, the luminance of partial white display (luminance enhancement) is increased by a decreased amount of the luminance of the transmissive region 30A. This is because the bulk 64A and the microparticle 64B are formed to mainly contain respective optical anisotropic materials, scattering property in the oblique direction is suppressed and leakage of light form the light guide plate in a dark state is suppressed. Therefore, the light is guided from the partial dark region to the partial bright region so that luminance enhancement is achievable without increasing power supplied to the backlight 2.

Moreover, in the present embodiment, when the vertical alignment film has the above-described pretilt function, in a region where a voltage is not applied between the partial electrodes 32A and the upper electrode 36, the optical axis AX4 of the microparticle 64B is parallel (or substantially parallel) to the light incident surface 10A of the light guide plate 10, and intersects the normal of the transparent substrate 31 at a predetermined pretilt angle. Specifically, the liquid crystal molecule contained in the microparticle 64B is aligned in a state of being inclined at the predetermined pretilt angle in a plane parallel to the light incident surface 10A. Therefore, when a voltage is applied between the partial electrodes 32A and the upper electrode 36, the liquid crystal molecule contained in the microparticle 64B does not stand up in a random direction, and stands up in the plane parallel to the light incident surface 10A. At this time, the optical axis AX3 of the bulk 64A intersects or is orthogonal to the optical axis AX4 of the microparticle 64B in the plane parallel to the light incident surface 10A. Accordingly, in the region where a voltage is applied between the partial electrodes 32A and the upper electrode 36, difference in refractive index is increased in all directions including the front direction (the normal direction of the light modulation device 60) and the oblique direction, and high scattering property is obtainable. As a result, display luminance is allowed to be improved. In addition, luminance is allowed to be further improved by the effect of the above-described luminance enhancement.

Moreover, also in the present embodiment, the plurality of partial electrodes 32A arranged in the direction orthogonal to the light incident surface 10A are sequentially driven on the predetermined unit basis. Accordingly, during the process in which the light emitted from the light source 20 propagates through the light guide plate 10, the region exhibiting the scattering property (the scattering region 30B) of the light modulation layer 64 is scanned in the direction orthogonal to the light incident surface 10A. As a result, the light that is scattered in the scattering region 30B and is to be emitted from the upper surface of the backlight 2 to the outside is scanned in the direction orthogonal to the light incident surface 10A. At this time, since the scan driving of the light source 20 is not performed, luminance higher than that in the existing method in which scan driving of a light source is performed is obtainable by the effect of the above-described luminance enhancement. In addition, in the present embodiment, as described above, since the scan driving of the light source 20 is not performed, it is rarely necessary to consider inrush power generated when a large power is supplied to the light source in an extremely short time to perform the scan driving, and reliability of the circuit board is not impaired.

As described above, also in the present embodiment, light emitted from the upper surface of the backlight 2 is scanned by scanning the scattering region 30B of the light modulation layer 64 instead of the scan driving of the light source 20, and thus high luminance, low power consumption, high reliability of the circuit board are all achievable at a time in scan system.

<3. Modifications>
[First Modification]

In each of the above-described embodiments, during the process in which the plurality of partial electrodes 32A are sequentially driven on the predetermined unit basis, the drive circuit 50 may turn on the light source 20 constantly. For example, as illustrated in (A) and (B) of FIG. 19, when one or the plurality of partial electrodes 32A are regarded as one block, the drive circuit 50 may turn on the light source 20 in synchronization with drive of a first block, and may continuously turn on the light source 20 until completion of scanning of all blocks during the process in which the plurality of partial electrodes 32A are sequentially driven on a block basis.

Figure 19:
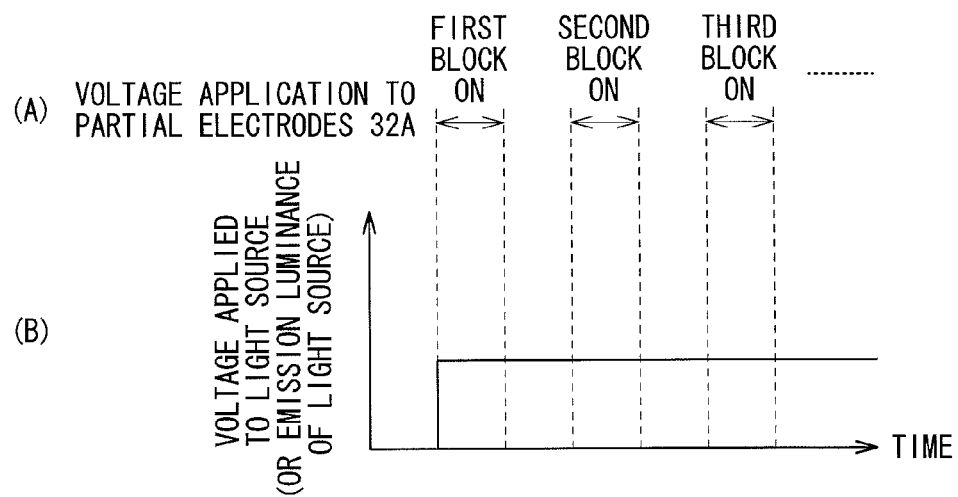
FIG. 19 is a schematic diagram for explaining an example of relationship between scan timing of partial electrodes and blinking timing of the light source.

Note that (A) of FIG. 19 conceptually illustrates an example of timings of voltage application to the partial electrodes 32A, and (B) of FIG. 19 schematically illustrates an example of a waveform of a voltage applied to the light source 20. In (A) and (B) of FIG. 19, the case where the drive circuit 50 turns on the light source 20 at the same time as driving of the first block is started is exemplified, however, the drive circuit 50 may turn on the light source 20 before driving of the first block is started. In addition, in consideration of a property in which a liquid crystal responds to the voltage application with a time lag, the drive circuit 50 may turn on the light source 20 immediately after the driving of the first block is started.

[Second Modification]

Moreover, in each of the above-described embodiments, the drive circuit 50 may blink the light source 20 in synchronization with the drive timings of the partial electrodes 32A during the process in which the plurality of partial electrodes 32A are sequentially driven on the predetermined unit basis. For example, as illustrated in (A) and (B) of FIG. 20, the drive circuit 50 may turn on the light source 20 only in a period where a voltage is applied to the partial electrodes 32A during the process in which the plurality of partial electrodes 32A are sequentially driven on the predetermined unit basis.

Figure 20:
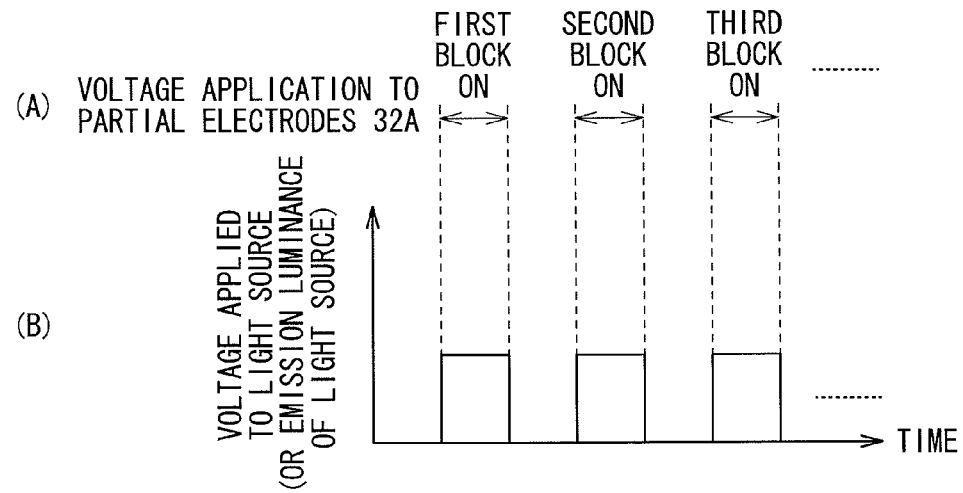
FIG. 20 is a schematic diagram for explaining another example of the relationship between the scan timing of the partial electrodes and the blinking timing of the light source.

Note that (A) of FIG. 20 conceptually illustrates an example of timings of voltage application to the partial electrodes 32A, and (B) of FIG. 20 schematically illustrates an example of a waveform of a voltage applied to the light source 20. In (A) and (B) of FIG. 20, the case where the drive circuit 50 turns on the light source 20 at the same time as driving of each block is started is exemplified, however, the drive circuit 50 may turn on the light source 20 before the driving of each block is started. In addition, in consideration of the property in which the liquid crystal responds to the voltage application with a time lag, the drive circuit 50 may turn on the light source 20 immediately after the driving of each block is started.

In the present modification, it may be said that the drive circuit 50 turns on the light source 20 when the light modulation layer 34 exhibits the scattering property in some regions thereof, and turns off the light source 20 when the light modulation layer 34 exhibits transparency over the entire region thereof.

Incidentally, in each of the above-described embodiments, when the scan driving is performed at high speed (for example, at several hundreds Hz), a waveform of the voltage applied to the partial electrode 32A may be distorted by a time constant determined by wiring resistance of the partial electrode 32A and an electrostatic capacitance of the light modulation layer 34 (or the light modulation layer 64), and thus the applied waveform may be delayed at an end of the partial electrode 32A. In this case, in the light emitted from the backlight 1 (or the backlight 2), defects in image quality such as difference in brightness in a direction corresponding to the extending direction of the partial electrode 32A and interference of adjacent scan region may occur. Therefore, for example, as illustrated in (A) and (B) of FIG. 20, when such defects occur, it is preferable to blink the light source 20 in synchronization with the drive timings of the partial electrodes 32A during the process in which the plurality of partial electrodes 32A are sequentially driven on the predetermined unit basis. In this way, image quality at the time of high speed scan driving is allowed to be improved.

[Third Modification]

Figure 21:
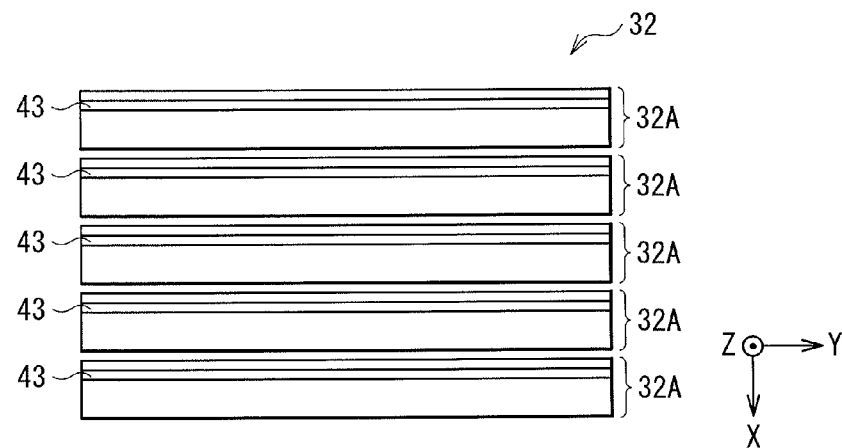
FIG. 21 is a plan view illustrating a first modification of the configuration of the electrode of FIG. 1.

In addition, in each of the above-described embodiments and the modification thereof (hereinafter, simply referred to as "each of the above-described embodiments and the like"), for example, as illustrated in FIG. 21, a metal wiring 43 extending in the extending direction of the partial electrodes 32A may be provided to be in contact with each of the partial electrodes 32A. The metal wiring 43 is preferably formed of a material that has a surface to be a mirror as much as possible and has wiring resistance as low as possible. Examples of such a material include Al (aluminum), Ag (silver), Au (gold), Cu (copper), Mo (molybdenum), and Ta (tantalum). The metal wiring 43 preferably has a width to the extent where the metal wiring 43 does not become a dark line for the backlight 1 or 2, and the width is preferably 500 µm or less, is more preferably 300 µm or less, and is still more preferably 150 µm or less.

[Fourth Modification]

In addition, in each of the above-described embodiments and the like, the drive circuit 50 may adjust the light amount of the light source 20 depending on the distance of the partial electrode 32A to be driven from the light source 20. For example, the drive circuit 50 may increase the light amount of the light source 20 with increasing the distance of the partial electrode 32A to be driven from the light source 20.

[Fifth Modification]

Figure 22:
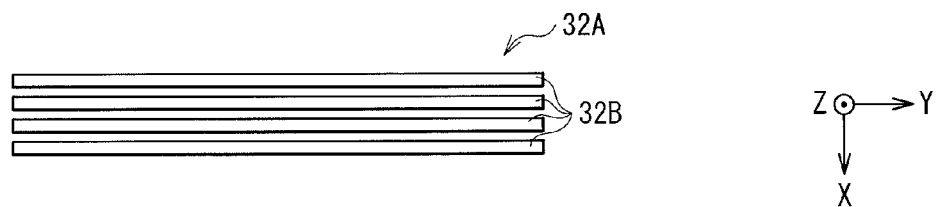
FIG. 22 is a plan view illustrating a second modification of the configuration of the electrode of FIG. 1.
Figure 23:
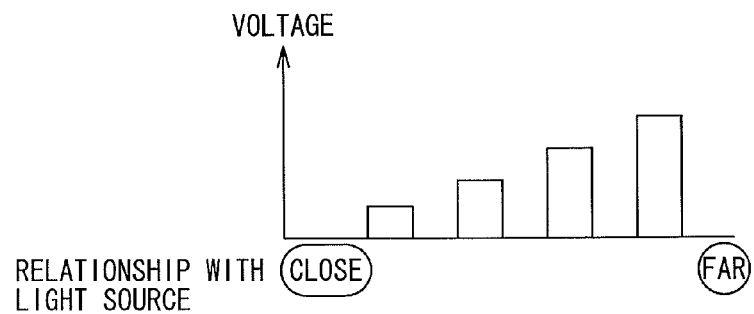
FIG. 23 is a plan view illustrating an example of a voltage applied to each thin wire electrode of FIG. 22.

Moreover, in each of the above-described embodiments and the like, as illustrated in FIG. 22, each of the partial electrodes 32A may be configured of a plurality of thin wire electrodes 32B. Note that, the thin wire electrode 32B corresponds to a specific example of "partial electrode" of the invention in some cases. Incidentally, in the present modification, the drive circuit 50 may apply a voltage that is modulated depending on the distance from the light source 20, to the plurality of thin wire electrodes 32B included in the partial electrode 32A to be driven during the process in which the plurality of partial electrodes 32A are sequentially driven on the predetermined unit basis. For example, as illustrated in FIG. 23, the drive circuit 50 may apply, to the plurality of thin wire electrodes 32B included in the partial electrode 32A to be driven, a voltage whose crest value is increased with increasing the distance from the light source 20 during the process in which the plurality of partial electrodes 32A are sequentially driven on the predetermined unit basis. In addition, the drive circuit 50 may sequentially drive the plurality of thin wire electrodes 32B on a predetermined unit basis (for example, for each partial electrode 32A), or may sequentially drive the plurality of thin wire electrodes 32B one by one.

[Sixth Modification]

Figure 24A:
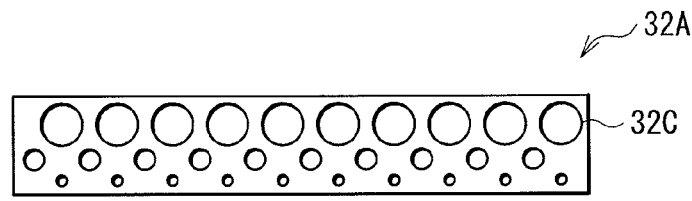
FIG. 24 is a plan view illustrating a third modification of the configuration of the electrode of FIG. 1.
Figure 24B:
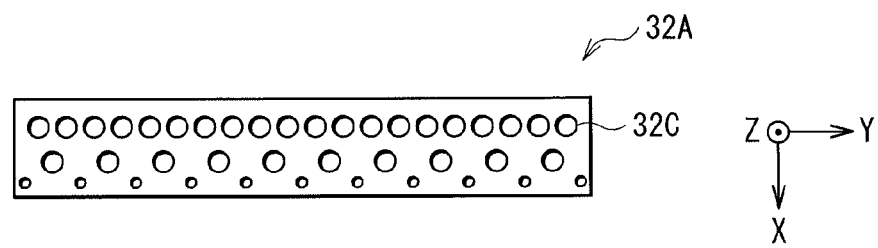

In addition, in each of the above-described embodiments and the like, each of the partial electrodes 32A may be patterned. For example, as illustrated in FIGS. 24(A) and 24(B), each of the partial electrodes 32A may have a plurality of openings 32C. The opening 32C has, for example, a circular shape, an ellipsoidal shape, or a multangular shape. At this time, density of the plurality of openings 32C (occupancy of the openings 32B per unit area) provided in each of the partial electrodes 32A is varied depending on the distance from the light source 20. For example, as illustrated in FIG. 24(A), the number of the openings 32C per unit area may be fixed irrespective of the distance from the light source 20, and the diameter of the opening 32C may be decreased with increasing the distance from the light source 20. In addition, for example, as illustrated in FIG. 24(B), the diameter of the opening 32C may be fixed irrespective of the distance from the light source 20, and the number of the openings 32C per unit area may be decreased with increasing the distance from the light source 20. Therefore, in both of the above-described examples, the density of the openings 32C becomes sparse (is decreased) with increasing the distance from the light source 20. In other words, the pattern density of the partial electrode 32A (occupancy of a region other than the openings 32C in the partial electrode 32A per unit area) becomes dense (is increased) with increasing the distance from the light source 20.

As described above, varying the pattern density of the partial electrode 32A depending on the distance from the light source 20 provides a desired density distribution of the transparent region 30A and the scattering region 30B in the light emission region of the backlight 1 or 2. Therefore, the luminance on a side closer to the light source 20 in the light emission region of the backlight 1 or 2 is suppressed as compared with the case where the light modulation device 30 or 60 is not provided, and the luminance on a side farther from the light source 20 in the light emission region of the backlight 1 or 2 is allowed to be higher than that in the case where the light modulation device 30 or 60 is not provided. As a result, for example, in addition to the case where the entire light emission region of the backlight 1 or 2 is in a dark state, also in the case where the entire light emission region of the backlight 1 or 2 is in a bright state, in-plane luminance is allowed to be uniform. Accordingly, for example, when white display is performed in a region closer to the light source 20 and in a region farther from the light source 20, white luminance in both regions are allowed to be equivalent to each other. Moreover, for example, when a black display is performed in the region closer to the light source 20 and in the region farther from the light source 20, black luminance in both regions are allowed to be equivalent to each other. As described above, in the present modification, the modulation ratio is allowed to be increased while in-plane luminance is uniform.

[Seventh Modification]

Figure 25:
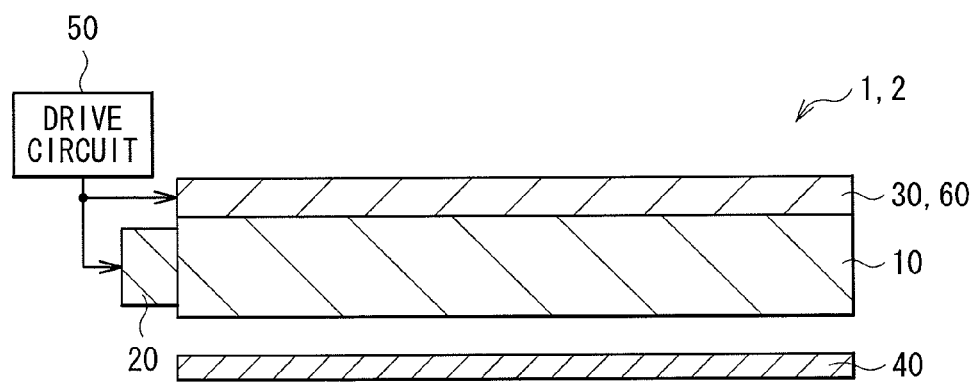
FIG. 25 is a sectional diagram illustrating a first modification of the configuration of the backlight of FIG. 1 or FIG. 16.
Figure 26:
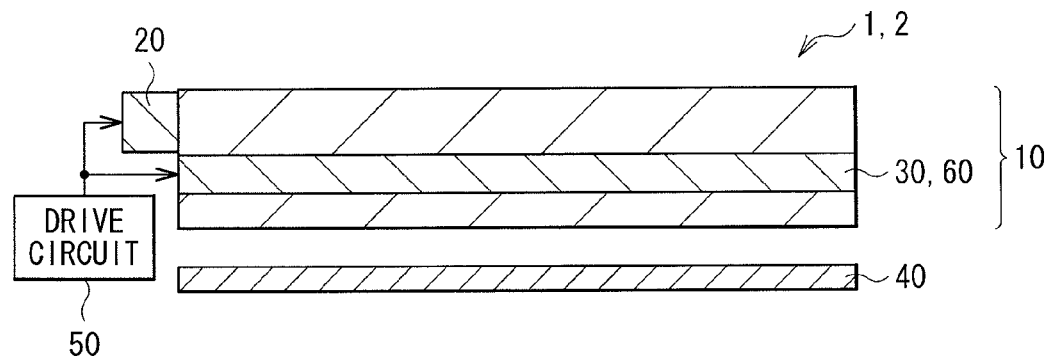
FIG. 26 is a sectional diagram illustrating a second modification of the configuration of the backlight of FIG. 1 or FIG. 16.

Moreover, in each of the above-described embodiments and the like, the light modulation device 30 or 60 is tightly adhered to the back (the lower surface) of the light guide plate 10 without an air layer in between, however, for example, as illustrated in FIG. 25, the light modulation device 30 or 60 may be tightly adhered to the upper surface of the light guide plate 10 without an air layer in between. In addition, for example, as illustrated in FIG. 26, the light modulation device 30 or 60 may be provided inside the light guide plate 10. However, also in this case, it is necessary for the light modulation device 30 or 60 to be tightly adhered to the light guide plate 10 without an air layer in between.

[Eighth Modification]

Figure 27:
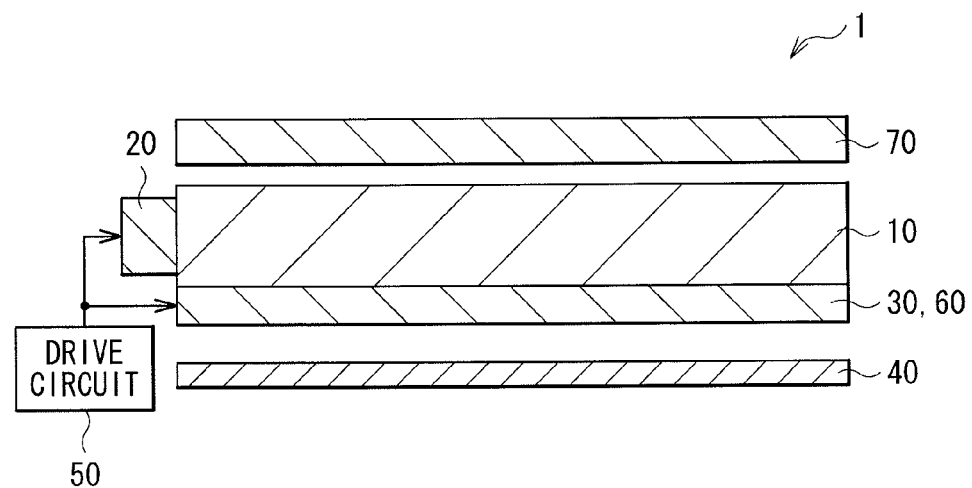
FIG. 27 is a sectional diagram illustrating a third modification of the configuration of the backlight of FIG. 1 or FIG. 16.

In addition, in the above-described embodiments and the like, nothing is provided particularly on the light guide plate 10, however, for example as illustrated in FIG. 27, an optical sheet 70 (for example, a diffuser plate, a diffuser sheet, a lens film, or a polarization separation sheet) may be provided. In such a case, part of the light emitted from the light guide plate 10 in the oblique direction stands up in the front direction, and thus the modulation ratio is effectively improved.

<Application Examples>

[First Application Example]

Next, an application example of the backlights 1 and 2 of the above-described embodiments and the like will be described.

Figure 28:
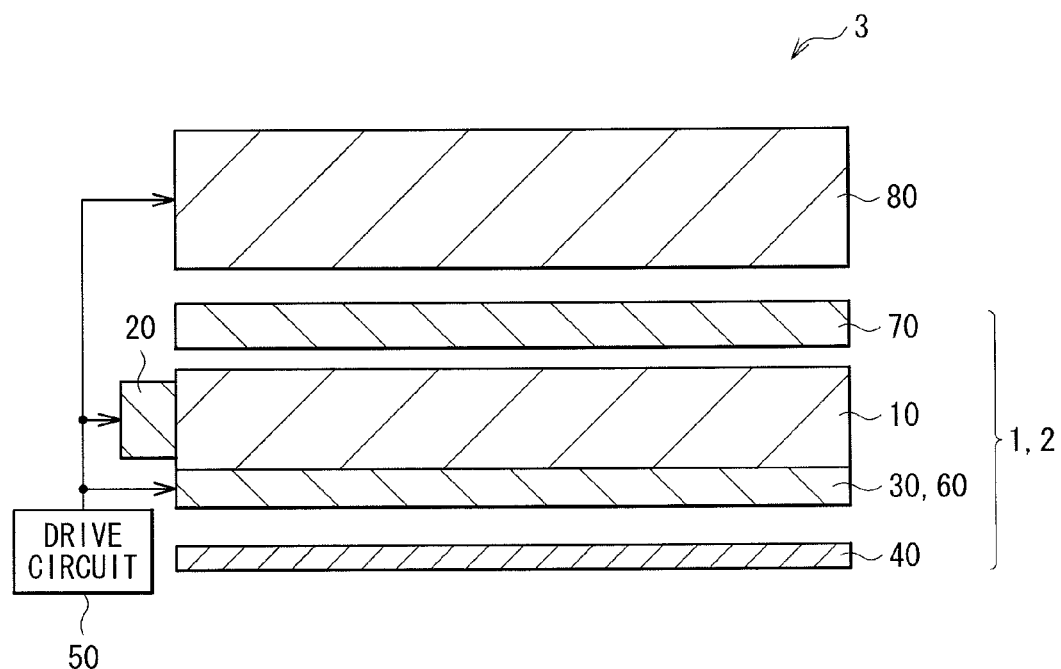
FIG. 28 is a sectional diagram illustrating an example of a display according to an application example.

FIG. 28 illustrates an example of a schematic configuration of a display 3 according to the present application example. The display 3 includes a display panel 80 and the backlight 1 or 2 provided behind the display panel 80.

The display panel 80 displays a picture. The display panel 80 includes a plurality of pixels two-dimensionally arranged, and the plurality of pixels are driven based on a picture signal to allow the display panel 80 to display a picture. The display panel 80 is, for example, a transmissive liquid crystal display panel, and has a structure in which a liquid crystal layer is sandwiched between a pair of transparent substrates. The display panel 80 includes, for example, although not illustrated, a polarizer, a transparent substrate, pixel electrodes, an alignment film, a liquid crystal layer, an alignment film, a common electrode, a color filter, a transparent substrate, and a polarizer in order from the backlight 1 or 2 side.

The transparent substrate is formed of a substrate transparent to visible light, for example, a plate glass. Incidentally, although not illustrated, a TFT (thin film transistor) electrically connected to the pixel electrodes and an active drive circuit including wirings and the like are formed on the transparent substrate on the backlight 1 or 2 side. The pixel electrodes and the common electrode are each formed of, for example, ITO. The pixel electrodes are arranged regularly, for example, in lattice arrangement or delta arrangement, on the transparent substrate. The pixel electrode functions as an electrode for each pixel. On the other hand, the common electrode is formed on the entire surface of the color filter. The common electrode functions as a common electrode opposing to the pixel electrodes. The alignment film is formed of a polymer material such as polyimide, and performs alignment treatment on the liquid crystal. The liquid crystal layer is formed of a liquid crystal of, for example, VA (Vertical Alignment) mode, TN (Twisted Nematic) mode, or STN (Super Twisted Nematic) mode, and has a function of changing the direction of the polarizing axis of the light emitted from the backlight 1 or 2 for each pixel, in response to a voltage applied from the drive circuit (not illustrated). Incidentally, the direction of the transmission axis for each pixel is adjusted at multiple levels by changing the arrangement of the liquid crystal at multiple levels. The color filter is configured by arranging, corresponding to the arrangement of the pixel electrodes, color filters that separates light that has passed through the liquid crystal layer, into three primary colors of red (R), green (G), and blue (B), for example, or into four colors of R, G, B, and white (W). Examples of the filter arrangement (pixel arrangement) include, typically, stripe arrangement, diagonal arrangement, delta arrangement, and rectangle arrangement.

The polarizer is a kind of an optical shutter, and allows light (polarized light) that oscillates in a certain direction to pass therethrough. Note that the polarizer may be an absorption type polarizing device absorbing light (polarized light) that oscillates in a direction other than the transmission axis, however, the polarizer is preferably a reflection type polarizing device reflecting the light toward the backlight 1 or 2 side in terms of luminance improvement. The polarizers are disposed so that the polarizing axes are different by 90 degrees from each other, and this allows the light emitted from the backlight 1 or 2 to pass therethrough through the liquid crystal layer or to be blocked.

In the backlight 1 or 2, the plurality of partial electrodes 32A are arranged in a direction parallel to one arrangement direction (for example, a vertical direction) of the plurality of pixels (or pixel electrodes) of the display panel 80. Incidentally, when the plurality of pixels (or pixel electrodes) are arranged also in a horizontal direction, the plurality of partial electrodes 32A preferably extend in the horizontal direction. The width of each of the partial electrodes 32A may be equal to, however, is preferably wider than the width of each pixel of the display panel 80. This is because the scanning of each scattering region 30B of the backlight 1 or 2 is not necessarily precise unlike the scanning of the pixels of the display panel 80. Note that, in the following, it is assumed that the width of each of the partial electrodes 32A is wider than the width of each pixel of the display panel 80.

In the present application example, the drive circuit 50 sequentially drives the plurality of pixels (or pixel electrodes) of the display panel 80 for each line to modulate the light emitted from the backlight 1 or 2 by the display panel 80. Therefore, the drive circuit 50 displays a picture on the display panel 80. In addition, the drive circuit 50 sequentially drives the plurality of partial electrodes 32A of the backlight 1 or 2 on the predetermined unit basis to scan the region exhibiting the scattering property (the scattering region 30B) of the light modulation layer 34 or 64 in the direction orthogonal to the light incident surface 10A. Accordingly, the drive circuit 50 scans the light that is scattered in the scattering region 30B and is to be emitted from the upper surface of the backlight 1 or 2 to the back surface of the display panel 80, in the direction orthogonal to the light incident surface 10A during the process in which the light emitted from the light source 20 propagates through the light guide plate.

Further, the drive circuit 50 drives the plurality of partial electrodes 32A in synchronization with driving of the plurality of pixels of the display panel 80. For example, as illustrated in (A) and (B) of FIG. 29, when the plurality of pixels corresponding to a plurality of lines (in the drawing, 135 lines) are regarded as one block and one or the plurality of partial electrodes 32A corresponding to the block are regarded as one block, the drive circuit 50 drives one or the plurality of partial electrodes 32A included in a block corresponding to a block that includes a pixel to be driven, out of the plurality of partial electrodes 32A, during the process in which the plurality of pixels of the display panel 80 are sequentially driven on a line basis. Note that (A) of FIG. 29 conceptually illustrates an example of timings of voltage application to the plurality of pixels of the display panel 80, and (B) of FIG. 29 conceptually illustrates an example of timings of voltage application to the partial electrodes 32A.

Figure 29:
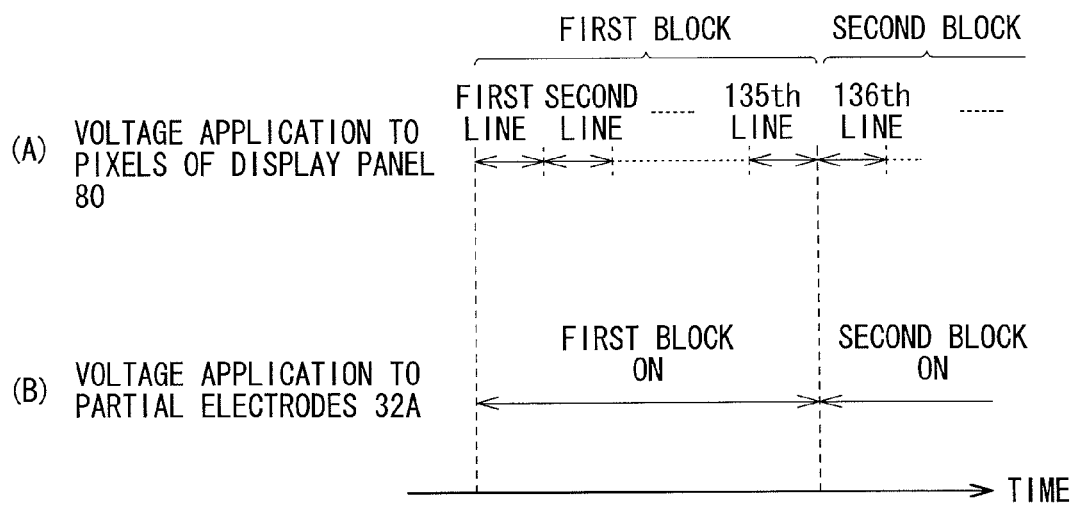
FIG. 29 is a schematic diagram for explaining an example of relationship between scan timing of pixels of a display panel and scan timing of partial electrodes in the display of FIG. 28.

In (A) and (B) of FIG. 29, the case where the drive circuit 50 starts to drive the partial electrodes 32A at the same time as driving of the pixels of the display panel 80 is started is exemplified, however, the drive circuit 50 may start to drive the partial electrodes 32A before the driving of the pixels of the display panel 80 is started. In addition, in consideration of property in which the liquid crystal responds to voltage application with a time lag, the drive circuit 50 may start to drive the partial electrodes 32A immediately after the driving of the pixels of the display panel 80 is started.

In addition, the drive circuit 50 may drive one or a plurality of partial electrodes 32A included in a block corresponding to a block that includes a pixel to be driven, out of the plurality of partial electrodes 32A, and may blink the light source 20 in synchronization with the drive timing of the partial electrode 32A, during the process in which the plurality of pixels of the display panel 80 are sequentially driven on a line basis. For example, the drive circuit 50 may turn on the light source 20 as described in the above-described second modification. In such a case, display with high luminance and suppressed blur of moving picture responsiveness becomes possible.

In the present application example, as the light source illuminating the display panel 80, the backlight 1 or 2 of the above-described embodiments is used. Therefore, in the scan system, an image with high contrast and high display luminance is allowed to be displayed with low power consumption. Moreover, in the present application example, when the plurality of partial electrodes 32A are driven in synchronization with the driving of the plurality of pixels of the display panel 80 and the light source 20 is blinked in synchronization with sequential driving of the partial electrodes 32A on the predetermined unit basis, display with high luminance and suppressed blur of moving picture responsiveness becomes possible.

[Second Application Example]

Next, other application example of the backlights 1 and 2 of the above-described embodiments and the like will be described.

Figure 30:
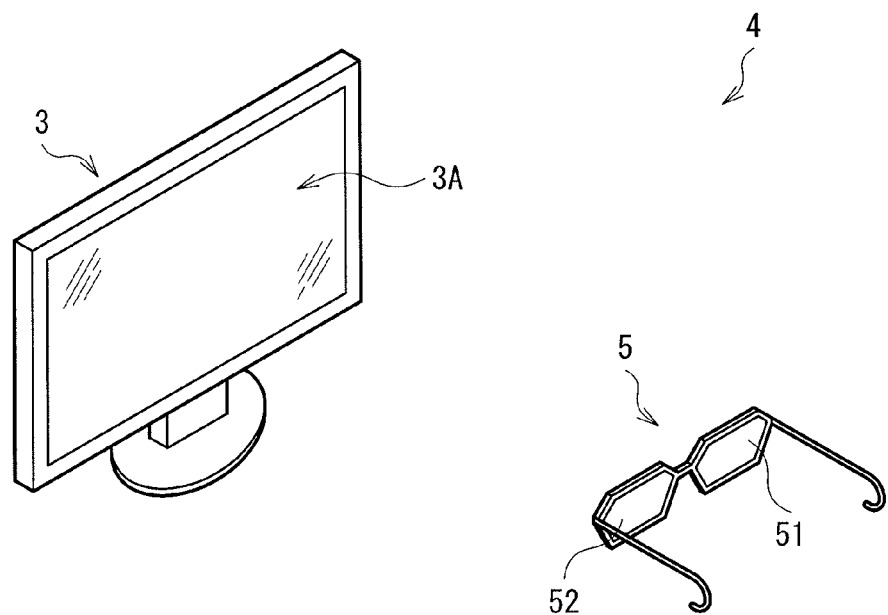
FIG. 30 is a perspective view illustrating an example of a three-dimensional display according to another application example.

FIG. 30 illustrates an example of a schematic configuration of a three-dimensional display 4 according to the present application example. The three-dimensional display 4 allows observation of a stereoscopic image by time-division system, and includes, for example, a display 3 and shutter glasses 5. The display 3 is a display (3D display) allowing a viewer to perceive a stereoscopic picture when the viewer views the image display surface 3A of the display 3 through the shutter glasses 5.

In the display 3, although not illustrated, for example, the drive circuit 50 includes a picture signal processing circuit, a timing generation circuit, a signal line drive circuit, and a scan line drive circuit. The picture signal processing circuit performs a predetermined correction on a digital picture signal input from the outside, and outputs a corrected picture signal to the signal line drive circuit. Examples of a kind of the picture signal include a picture signal for right-eye image, a picture signal for left-eye image, and a picture signal for black image. Moreover, examples of the predetermined correction includes gamma correction and overdrive correction.

The timing generation circuit controls the signal line drive circuit, the scan line drive circuit, and the shutter glasses 5 to operate in conjunction with one another. For example, the timing generation circuit outputs a control signal to these circuits and the like in response to (in synchronization with) a synchronization signal input from the outside.

The signal line drive circuit applies an analog picture signal corresponding to the picture signal input from the picture signal processing circuit to each signal line (not illustrated) in the display panel 80 in response to (in synchronization with) the input of the above-described control signal, and writes the analog picture signal or a signal corresponding thereto in a pixel to be selected. For example, the signal line drive circuit applies, for each frame period, a signal voltage corresponding to the picture signal for black image, a signal voltage corresponding to the picture signal for right-eye image, the signal voltage corresponding to the picture signal for black image, and a signal voltage corresponding to the picture signal for left-eye image in this order to each signal line, and writes the signal to a pixel to be selected.

The scan line drive circuit sequentially applies a selection pulse to a plurality of scan lines (not illustrated) in the display panel 80 in response to (in synchronization with) the input of the above-described control signal, and sequentially selects the plurality of pixels for each line.

The shutter glasses 5 are worn in front of eyes of a viewer (not illustrated), and are used by the viewer when the viewer views an image displayed on the image display surface 3A of the display 3. The shutter glasses 5 includes, for example, a right-eye shutter 51, a left-eye shutter 52, and a control line (not illustrated) applying a control signal for controlling open and close of the right-eye shutter 51 and open and close of the left-eye shutter 52. The control line for shutter control may be directly connected to the drive circuit 50 of the display 3, or may be connected to a wireless unit (not illustrated) capable of communicating with the drive circuit 50 of the display 3. The right-eye shutter 51 and the left-eye shutter 52 performs transmission and blocking of an image output from the image display surface 3A based on the control signal. The right-eye shutter 51 is opened when a right-eye image is output from the image display surface 3A. On the other hand, the left-eye shutter 52 is opened when a left-eye image is output from the image display surface 3A.

In the following, a period during which at least a part of the right-eye image is displayed on the image display surface 3A is referred to as a period for displaying a right-eye image (right-eye image display period). Likewise, a period during which at least a part of the left-eye image is displayed on the image display surface 3A is referred to as a period for displaying a left-eye image (left-eye image display period). In addition, a period during which a black image is displayed on the entire image display surface 3A is referred to as a period for displaying a black image (black image display period).

For example, the drive circuit 50 repeats the black image display period, the right-eye image display period, the black image display period, and the left-eye image display period, for each frame period. At this time, the viewer wears the shutter glasses 5 to perceive the left-eye image only by his left eye and to perceive the right-eye image only by his right eye. For example, the drive circuit 50 outputs a control signal for opening the left-eye shutter 52 (for allowing the left-eye glass to be in a transmissive state) during the left-eye image display period, and outputs a control signal for closing the left-eye shutter 52 (for allowing the left-eye glass to be in a non-transmissive state) during the other periods. In addition, the drive circuit 50 outputs a control signal for opening the right-eye shutter (for allowing the right-eye glass to be in a transmissive state) during the right-eye image display period, and outputs a control signal for closing the right-eye shutter (for allowing the right-eye glass to be in a non-transmissive state) during the other periods. Accordingly, the left-eye image is perceived only by the left eye and the right-eye image is perceived only by the right eye, and therefore the left-eye image and the right-eye image are imaged on the retina of the viewer. As a result, the viewer can view a stereoscopic picture.

The drive circuit 50 sequentially drives the plurality of partial electrodes 32A on the predetermined unit basis to scan the region exhibiting the scattering property (the scattering region 30B) of the light modulation layer 34 or 64 in the direction orthogonal to the light incident surface 10A. Therefore, the drive circuit 50 scans the light that is scattered in the scattering region 30B and is to be emitted from the upper surface of the backlight 1 or 2 to the outside in the direction orthogonal to the light incident surface 10A, during the process in which the light emitted from the light source 20 propagates through the light guide plate. Similarly to the above-described first application example, the drive circuit 50 drives the plurality of partial electrodes 32A in synchronization with the drive of the plurality of pixels of the display panel 80. Further, similarly to the above-described first application example, the drive circuit 50 may drive the plurality of partial electrodes 32A in synchronization with the drive of the plurality of pixels of the display panel 80 as well as may blink the light source 20 in synchronization with the sequential drive of the partial electrodes 32A on the predetermined unit basis.

In the present application example, the backlight 1 or 2 of the above-described embodiments is used as the light source illuminating the display panel 80. Therefore, in the scan system, an image with high contrast and high display luminance is displayed with low power consumption. In addition, in the present application example, when the plurality of partial electrodes 32A are driven in synchronization with the drive of the plurality of pixels of the display panel 80 as well as the light source 20 is blinked in synchronization with the sequential drive of the partial electrodes 32A, display with high luminance and suppressed blur of moving picture responsiveness becomes possible and occurrence of crosstalk between the left-eye image and the right-eye image is allowed to be suppressed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display comprising:
a lighting unit outputting illumination light;
a display panel modulating the illumination light to output a picture; and
a drive circuit driving the lighting unit and the display panel, wherein
the lighting unit includes
a light guide plate,
a light source disposed on a side surface of the light guide plate, and
a light modulation device disposed on a surface or in an inside of the light guide plate and bonded to the light guide plate,
the light modulation device includes
a pair of transparent substrates disposed opposite to each other with a distance in between,
a pair of electrodes disposed on respective surfaces of the pair of transparent substrates, and
a light modulation layer provided in a gap between the pair of transparent substrates,
one or both of the pair of electrodes have a plurality of partial electrodes arranged in a direction orthogonal to a light incident surface of side surfaces of the light guide plate, the light incident surface receiving light from the light source,
the light modulation layer totally or partially exhibits scattering property or transparency to the light from the light source depending on a magnitude of an electric field generated by the electrodes, and
the drive circuit sequentially drives the plurality of partial electrodes on a predetermined unit basis such that a region exhibiting the scattering property of the light modulation layer is sequentially transferred from unit to unit in the direction orthogonal to the light incident surface while the remaining units exhibit transparency,
wherein the drive circuit adjusts a light amount of the light source depending on a distance of the partial electrode to be driven of the plurality of partial electrodes from the light source.

2. The display according to claim 1, wherein
the display panel includes a plurality of pixels two-dimensionally arranged,
the plurality of partial electrodes are arranged in a first direction parallel to one arrangement direction of the plurality of pixels, and
the drive circuit sequentially drives the plurality of pixels on the predetermined unit basis in the first direction and drives the plurality of partial electrodes in synchronization with the drive of the plurality of pixels.

3. The display according to claim 2, wherein the light modulation layer exhibits transparency when a voltage is not applied to the electrodes, and exhibits scattering property when a voltage is applied to the electrodes.

4. The display according to claim 3, wherein the light modulation layer includes a liquid crystal molecule and a polymer, the liquid crystal molecule responding to the electric field generated by the electrodes at a relatively high speed, and the polymer responding to the electrode field generated by the electrodes at a relatively low speed.

5. The display according to claim 4, wherein the liquid crystal molecule and the polymer are aligned in a direction parallel to or substantially parallel to the light incident surface and the transparent substrates when a voltage is not applied to the electrodes.

6. The display according to claim 1, wherein the drive circuit constantly turns on the light source.

7. The display according to claim 1, wherein the drive circuit turns on the light source when the light modulation layer exhibits scattering property, and turns off the light source when the light modulation layer totally exhibits transparency.

8. The display according to claim 1, wherein
the light source is disposed on a first side surface and a second side surface of side surfaces of the light guide plate, the first side surface and the second side surface facing each other, and
the drive circuit sequentially drives the plurality of partial electrodes on the predetermined unit basis, makes the light source disposed on the first side surface blighter than the light source disposed on the second side surface when the partial electrode to be driven is located closer to the first side surface, and makes the light source disposed on the second side surface brighter than the light source disposed on the first side surface when the partial electrode to be driven is located closer to the second side surface.

9. The display according to claim 1, wherein
each of the partial electrodes is formed of a plurality of thin wire electrodes, and
the drive circuit applies a voltage to the plurality of thin wire electrodes included in the partial electrode to be driven when sequentially driving the plurality of partial electrodes on the predetermined unit basis, the voltage being modulated depending on the distance from the light source.

10. The display according to claim 1, wherein
each of the partial electrodes is patterned, and
a pattern density of each of the partial electrodes is varied depending on the distance from the light source.

11. The display according to claim 10, wherein
each of the partial electrodes has a plurality of openings,
each of the openings has a fixed diameter irrespective of the distance from the light source, and
a density of the openings is varied depending on the distance from the light source.

12. The display according to claim 10, wherein
each of the partial electrodes has a plurality of openings,
each of the openings has a different diameter depending on the distance from the light source, and
a density of the openings is varied depending on the distance from the light source.

13. The display according to claim 1, wherein
each of the partial electrodes has a strip shape extending in a direction parallel to the light incident surface, and the light modulation device extends in the direction parallel to the light incident surface and has a plurality of metal wires electrically connected to the respective partial electrodes.

14. A three-dimensional display comprising:
a display outputting a picture and a control signal; and
shutter glasses having a right-eye shutter and a left-eye shutter, the right-eye shutter and the left-eye shutter performing transmission and blocking of the picture based on the control signal, wherein
the display includes
  a lighting unit outputting illumination light,
  a display panel modulating the illumination light to output the picture,
  an output circuit outputting the control signal, and
  a drive circuit driving the lighting unit, the display panel, and the output circuit,
the lighting unit includes
  a light guide plate,
  a light source disposed on a side surface of the light guide plate, and
  a light modulation device disposed on a surface or in an inside of the light guide plate and bonded to the light guide plate,
the light modulation device includes
  a pair of transparent substrates disposed opposite to each other with a distance in between,
  a pair of electrodes disposed on respective surfaces of the pair of transparent substrates, and
  a light modulation layer provided in a gap between the pair of transparent substrates,
one or both of the pair of electrodes have a plurality of partial electrodes arranged in a direction orthogonal to a light incident surface of side surfaces of the light guide plate, the light incident surface receiving light from the light source,
the light modulation layer totally or partially exhibits scattering property or transparency to the light from the light source depending on a magnitude of an electric field generated by the electrodes, and
the drive circuit sequentially drives the plurality of partial electrodes on a predetermined unit basis such that a region exhibiting the scattering property of the light modulation layer is sequentially transferred from unit to unit in the direction orthogonal to the light incident surface while the remaining units exhibit transparency,
wherein the drive circuit adjusts a light amount of the light source depending on a distance of the partial electrode to be driven of the plurality of partial electrodes from the light source.

15. A lighting unit comprising:
a light guide plate;
a light source disposed on a side surface of the light guide plate;
a light modulation device disposed on a surface or in an inside of the light guide plate and bonded to the light guide plate; and
a drive circuit driving the light source and the light modulation device, wherein
the light modulation device includes
  a pair of transparent substrates disposed opposite to each other with a distance in between,
  a pair of electrodes disposed on respective surfaces of the pair of transparent substrates, and
  a light modulation layer provided in a gap between the pair of transparent substrates,
one or both of the pair of electrodes have a plurality of partial electrodes arranged in a direction orthogonal to a light incident surface of side surfaces of the light guide plate, the light incident surface receiving light from the light source,
the light modulation layer totally or partially exhibits scattering property or transparency to the light from the light source depending on a magnitude of an electric field generated by the electrodes, and
the drive circuit sequentially drives the plurality of partial electrodes on a predetermined unit basis to scan a region exhibiting the scattering property of the light modulation layer in the direction orthogonal to the light incident surface,
wherein the drive circuit adjusts a light amount of the light source depending on a distance of the partial electrode to be driven of the plurality of partial electrodes from the light source.

* * * * *